United States Patent
Lassen et al.

(10) Patent No.: US 8,495,233 B2
(45) Date of Patent: *Jul. 23, 2013

(54) SCHEDULING OF MULTIPLE FILES FOR SERVING ON A SERVER

(75) Inventors: Soren Lassen, Glebe (AU); Gavin Horn, San Diego, CA (US); Jeffrey J. Persch, San Diego, CA (US); Michael G. Luby, Berkeley, CA (US); Armin Haken, San Francisco, CA (US)

(73) Assignee: Digital Fountain, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,714

(22) Filed: Feb. 7, 2012

(65) Prior Publication Data

US 2012/0136973 A1   May 31, 2012

Related U.S. Application Data

(63) Continuation of application No. 12/370,193, filed on Feb. 12, 2009, now Pat. No. 8,122,139, which is a continuation of application No. 11/236,202, filed on Sep. 26, 2005, now Pat. No. 7,512,697, which is a continuation of application No. 09/792,364, filed on Feb. 22, 2001, now Pat. No. 7,072,971.

(60) Provisional application No. 60/248,443, filed on Nov. 13, 2000.

(51) Int. Cl.
*G06F 15/16* (2006.01)

(52) U.S. Cl.
USPC ................ 709/230; 712/1; 712/208; 725/103

(58) Field of Classification Search
USPC ........................ 709/233; 714/785; 712/1, 208
See application file for complete search history.

(56) References Cited

U.S. PATENT DOCUMENTS 5,371,532 A   12/1994   Gelman et al.
5,379,297 A   1/1995   Glover et al.

(Continued)

FOREIGN PATENT DOCUMENTS

WO   WO9634463 A1   10/1996
WO   WO0157667 A1   8/2001

(Continued)

OTHER PUBLICATIONS

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

(Continued)

*Primary Examiner* — Dustin Nguyen
(74) *Attorney, Agent, or Firm* — Ryan N. Farr

(57) ABSTRACT

Multiple files a served using a server coupled to a data network. A plurality of files is determined, wherein a file includes an integer number of blocks, and wherein each block includes at least one input symbol. For each file, an indication of at least one channel on which to serve the file is determined, and, for each file, a rate at which to serve the file is determined. Also, a schedule for processing the blocks is determined, and output symbols for the blocks are generated according to the schedule. The output symbols are transmitted on the corresponding at least one channel, wherein the files are concurrently served at their corresponding rates.

16 Claims, 28 Drawing Sheets

U.S. PATENT DOCUMENTS

| | | | |
|---|---|---|---|
| 5,617,541 | A | 4/1997 | Albanese et al. |
| 5,659,614 | A | 8/1997 | Bailey, III |
| 5,734,962 | A | 3/1998 | Hladik et al. |
| 5,751,336 | A | 5/1998 | Aggarwal et al. |
| 5,835,165 | A | 11/1998 | Keate et al. |
| 5,867,114 | A | 2/1999 | Barbir |
| 5,903,775 | A | 5/1999 | Murray |
| 5,926,205 | A | 7/1999 | Krause et al. |
| 5,936,659 | A | 8/1999 | Viswanathan et al. |
| 5,936,949 | A | 8/1999 | Pasternak et al. |
| 6,011,590 | A | 1/2000 | Saukkonen |
| 6,018,359 | A | 1/2000 | Kermode et al. |
| 6,073,250 | A | 6/2000 | Luby et al. |
| 6,081,909 | A | 6/2000 | Luby et al. |
| 6,134,596 | A * | 10/2000 | Bolosky et al. ............... 709/233 |
| 6,141,053 | A | 10/2000 | Saukkonen |
| 6,163,870 | A | 12/2000 | Luby et al. |
| 6,185,265 | B1 | 2/2001 | Campanella |
| 6,195,777 | B1 | 2/2001 | Luby et al. |
| 6,243,369 | B1 | 6/2001 | Grimwood et al. |
| 6,307,487 | B1 | 10/2001 | Luby |
| 6,320,520 | B1 | 11/2001 | Luby |
| 6,411,223 | B1 | 6/2002 | Haken et al. |
| 6,486,803 | B1 | 11/2002 | Luby et al. |
| 6,532,267 | B1 | 3/2003 | Heegard |
| 6,732,325 | B1 * | 5/2004 | Tash et al. .................... 714/785 |
| 6,882,618 | B1 | 4/2005 | Sakoda et al. |
| 7,072,971 | B2 | 7/2006 | Lassen et al. |
| 7,512,697 | B2 | 3/2009 | Lassen et al. |
| 8,122,139 | B2 | 2/2012 | Lassen et al. |

FOREIGN PATENT DOCUMENTS

| | | |
|---|---|---|
| WO | WO0158130 A2 | 8/2001 |
| WO | WO0158131 A2 | 8/2001 |

OTHER PUBLICATIONS

Aggarwal, C. et al.: "On Optimal Batching Policies for Video-on-Demand Storage Servers," Multimedia Systems, vol. 4, No. 4, pp. 253-258 (1996).

Almeroth, et al., "The use of multicast delivery to provide a scalable and interactive video-on-demand service", IEEE Journal on Selected Areas in Communication, 14(6): 1110-1122, (1996).

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Co-pending U.S. Appl. No. 09/587,542, filed on Jun. 1, 2000.

Dan, A. et al.: "Scheduling Policies for an On-Demand Video Server with Batching," Proc. ACM Multimedia, pp. 15-23 (Oct. 1998).

Eager, et al. "Minimizing bandwidth requirements for on-demand data delivery," Proceedings of the International Workshop on Advances in Multimedia Information Systems,p. 80-87 (Indian Wells, CA Oct. 1999).

Eager, et al., "Optimal and efficient merging schedules for video-on-demand servers", Proc. ACM Multimedia, vol. 7, pp. 199-202 (1999).

Gao, L. et al.: "Efficient Schemes for Broadcasting Popular Videos," Proc. Inter. Workshop on Network and Operating System Support for Digital Audio and Video, pp. 1- 13 (1998).

Hua, et al., "Skyscraper broadcasting: a new broadcasting system for metropolitan video-on-demand systems", Proc. ACM SIGCOMM, pp. 89-100 (Cannes, France, 1997).

Juhn, L. et al.: "Adaptive Fast Data Broadcasting Scheme for Video-on-Demand Service," IEEE Transactions on Broadcasting, vol. 44, No. 2, pp. 182-185 (Jun. 1998).

Juhn, L. et al.: "Harmonic Broadcasting for Video-on-Demand Service," IEEE Transactions on Broadcasting, vol. 43, No. 3, pp. 268-271 (Sep. 1997).

Ozden, et al., "A Low-cost Storage Service for Movie on Demand Databases," proceedings of the 20th Very Large Databases (VLDB) Conference (Santiago, Chile 1994).

Paris, et al., "A low bandwidth broadcasting protocol for video on demand", Proc. International Conference on Computer Communications and Networks, vol. 7, pp. 690-697 (Oct. 1998).

Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).

Rangan, et al., "Designing an On-Demand Multimedia Service," IEEE Communication Magazine, vol. 30, pp. 56-64, (Jul. 1992).

Sincoskie, W. D., "System Architecture for Large Scale Video on Demand Service," Computer Network and ISDN Systems, pp. 155-162, (1991).

Viswanathan, et al., "Metropolitan area video-on-demand services using pyramid broadcasting", Multimedia Systems, 4(4): 197-208 (1996).

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).

Viswanathan,Subramaniyam R., "Publishing in Wireless and Wireline Environments," Ph. D Thesis, Rutgers, The State University of New Jersey (Nov. 1994), 180pages.

Wong, J.W., "Broadcast delivery", Proceedings of the IEEE, 76(12): 1566-1577, (1988).

* cited by examiner

Block

| F(0) | IS(0) | IS(1) | ... | IS(81924) | IS(81925) | IS(81926) | IS(81927) | IS(81928) |
|---|---|---|---|---|---|---|---|---|
| F(1) | IS(81929) | IS(819230) | ... | IS(163833) | IS(163834) | IS(163835) | IS(163836) | IS(163837) |
| F(2) | IS(163838) | IS(163839) | ... | IS(245782) | IS(245783) | IS(245784) | IS(245785) | IS(245786) |
| F(3) | IS(245787) | IS(245788) | ... | IS(327711) | 0 | 0 | 0 | 0 |

FIG. 13a

Block

| F(0) | IS(0) | IS(1) | ... | IS(81924) | IS(81925) | IS(81926) | IS(81927) | 0 |
|---|---|---|---|---|---|---|---|---|
| F(1) | IS(81928) | IS(81929) | ... | IS(163832) | IS(163833) | IS(163834) | IS(163835) | 0 |
| F(2) | IS(163836) | IS(163837) | ... | IS(245780) | IS(245781) | IS(245782) | IS(245783) | 0 |
| F(3) | IS(245784) | IS(245785) | ... | IS(327708) | IS(327709) | IS(327710) | IS(327711) | 0 |

FIG. 13b

| | | | | |
|---|---|---|---|---|
| File 0 | F (0,0) | F (0,1) | F (0,2) | |
| File 1 | F (1,0) | F (1,1) | | |
| File 2 | F (2,0) | F (2,1) | F (2,2) | F (2,3) |

FIG. 15

| I1 | B( I1, F(j,0) ) | B( I1, F(j,1) ) | B( I1, F(j,2) ) |
|---|---|---|---|

| I2 | B( I2, F(j,0) ) | B( I2, F(j,1) ) | B( I2, F(j,2) ) |
|---|---|---|---|

| I3 | B( I3, F(j,0) ) | B( I3, F(j,1) ) | B( I3, F(j,2) ) |
|---|---|---|---|

| I4 | B( I4, F(j,0) ) | B( I4, F(j,1) ) | B( I4, F(j,2) ) |
|---|---|---|---|

Received packets with keys

FIG. 28a

| I1 | B( I1, F(j,0) ) | B( I2, F(j,1) ) | B( I1, F(j,2) ) |
|---|---|---|---|
| I2 | B( I2, F(j,0) ) | B( I2, F(j,1) ) | B( I2, F(j,2) ) |
| I3 | B( I3, F(j,0) ) | B( I3, F(j,1) ) | B( I3, F(j,2) ) |
| I4 | B( I4, F(j,0) ) | B( I4, F(j,1) ) | B( I4, F(j,2) ) |
| Received keys Initially stored in faster access memory | Temp0 file Initially stored in faster access memory | Temp1 file Initially stored in slower storage | Temp2 file Initially stored in slower storage |

FIG. 28b

| I1 | B( I1, F(j,0) ) | B( I2, F(j,1) ) | B( I1, F(j,2) ) |
|---|---|---|---|
| I2 | B( I2, F(j,0) ) | B( I2, F(j,1) ) | B( I2, F(j,2) ) |
| I3 | B( I3, F(j,0) ) | B( I3, F(j,1) ) | B( I3, F(j,2) ) |
| I4 | B( I4, F(j,0) ) | B( I4, F(j,1) ) | B( I4, F(j,2) ) |

Temp file

FIG. 28c

SCHEDULING OF MULTIPLE FILES FOR SERVING ON A SERVER

CROSS-REFERENCES TO RELATED APPLICATIONS

This application is a continuation of U.S. patent application Ser. No. 12/370,193, filed Feb. 12, 2009, entitled "SCHEDULING OF MULTIPLE FILES FOR SERVING ON A SERVER,", now U.S. Pat. No. 8,122,139, which is a continuation of U.S. Pat. No. 7,512,697, issued Mar. 31, 2009 (U.S. patent application Ser. No. 11/236,202, filed Sep. 26, 2005), entitled "SCHEDULING OF MULTIPLE FILES FOR SERVING ON A SERVER," which is a continuation of U.S. Pat. No. 7,072,971, issued Jul. 4, 2006 (U.S. patent application Ser. No. 09/792,364, filed Feb. 22, 2001), entitled "SCHEDULING OF MULTIPLE FILES FOR SERVING ON A SERVER," which claims the benefit of priority to U.S. Provisional Patent Application No. 60/248,443, filed Nov. 13, 2000, entitled "SCHEDULING MULTIPLE FILES ON A SINGLE SERVER," all of which are incorporated herein by reference for all purposes.

FIELD OF THE INVENTION

The present invention generally relates to communications systems. In particular, the present invention relates to efficiently scheduling multiple files for encoding and transmission in communications systems.

BACKGROUND OF THE INVENTION

Digital file transmission between a server and multiple receivers over a communications channel has been the subject of much literature. In general, a design goal of a file transmission system is to allow each recipient to receive an exact copy of data transmitted over a channel by a server with some level of certainty. A file transmission system may have to serve as many different files as there are active receivers, as each receiver may demand a different file. In addition, where different receivers request the same file at different points in time, a concern is how to efficiently serve the file to each receiver. Potentially each client may require an independent stream of the file it requested, where a stream is the flow of data from the server required by that client in order to download the file.

The file transmission systems that have been proposed in the literature can be divided into two distinct classes: (1) user-centered and (2) data-centered. In user-centered strategies, the bandwidth available at the server to serve a file is allocated according to client requests, i.e., the bandwidth assigned to serve a particular file can vary over time depending on how many clients are requesting that file. In data-centered strategies, the bandwidth available at the server is allocated among the different files, i.e., the bandwidth assigned to serve a particular file is independent of whether one or a million clients are requesting that file.

For a user-centered strategy, the server bandwidth requirement for a particular file can be expected to grow with the frequency of user requests for that file. This may be acceptable for a small number of users, but may be infeasible if the number of users grows very large for very popular files. For example, a typical user-centered strategy is the Transport Control Protocol ("TCP"). TCP is a point-to-point packet control scheme where a file or a data stream is partitioned into input symbols, input symbols are placed into consecutive packets, and a server transmits ordered packets across the channel and the recipient acknowledges receipt of each packet. If a packet is lost, or no acknowledgment is received at the server, the server will resend the packet. A TCP server therefore should maintain state as to which packets have been sent and which packets have been acknowledged as received by each client.

Some work proposes using broadcast or multicast mechanisms in order for a file transmission system to be scalable to a large number of clients. However, acknowledgment-based protocols like TCP do not scale well to broadcasting. For example, a sender broadcasting a file to multiple recipients requires a back channel from each recipient to the sender for acknowledgment data (either positive or negative), and should be powerful enough to be able to handle all of the acknowledgment data properly. Another drawback is that if different recipients lose different sets of packets, rebroadcast of packets missed by only a few of the recipients causes reception of useless duplicate packets by other recipients. Additionally, acknowledgment-based communication systems do not easily permit recipients to begin receiving a file asynchronous to the beginning of the broadcast, i.e., permit a recipient to begin receiving data in the middle of a transmission session.

Data-centered strategies using broadcast or multicast mechanisms are scalable to potentially millions of users as, unlike user-centered strategies, the server bandwidth required to serve a single file is independent of the number of user requests, or the frequency of user requests. A simple data-centered strategy that is sometimes used in practice is a carousel-based protocol. A carousel protocol partitions an input file into equal length input symbols, places each input symbol into a packet, and then continually cycles through and transmits all the packets. A major drawback with a carousel-based protocol is that if a recipient misses even one packet, then the recipient must wait another entire cycle before having a chance at receiving the missed packet, i.e., a carousel-based protocol can cause a large amount of duplicate data reception One approach to deal with data lost in transmission is to use erasure correcting codes such as Reed-Solomon Codes or Tornado Codes to increase reliability. One feature of several erasure correcting codes is that, when a file is partitioned into input symbols that are sent in packets to the recipient, the recipient can decode the packets to reconstruct the entire file once sufficiently many packets are received, generally regardless of which packets arrive. This property removes the need for acknowledgments at the packet level, since the file can be recovered even if packets are lost.

Erasure correcting codes, such as Reed-Solomon or Tornado codes generate a fixed number of output symbols for a fixed input file. These output symbols may comprise the K original input symbols and N-K redundant symbols. If storage permits, then the server can compute the set of output symbols for each file only once and transmit the output symbols using the carousel protocol above.

More recently, chain reaction coding systems have been developed for use in file transmission systems. U.S. Pat. No. 6,307,487, entitled "Information Additive Code Generator And Decoder For Communication Systems," U.S. Pat. No. 6,320,520, entitled "Information Additive Group Code Generator And Decoder For Communications Systems," U.S. Pat. No. 6,486,803, entitled "On Demand Encoding With a Window," and U.S. Pat. No. 6,411,223, entitled "Generating High Weight Encoding Symbols Using a Basis" describe various chain reaction coding systems in detail. As described therein, a chain reaction encoder generates output symbols from input symbols of the input file as needed. The server is continuously generating output symbols for each file being served. Therefore, what is needed is a server that does not require excessive computing power or memory at a sender to implement, and that can be used to efficiently distribute a plurality of files that are continuously being encoded.

BRIEF SUMMARY OF THE INVENTION

According to one embodiment of the invention, a method for serving multiple files using a server coupled to a data network is provided. The method comprises determining a plurality of files, wherein a file includes an integer number of blocks, and wherein each block includes at least one input symbol. The method also comprises, for each file, determining an indication of at least one channel on which to serve the file, and, for each file, determining a rate at which to serve the file. The method additionally comprises determining a schedule for processing the blocks, and generating output symbols for the blocks according to the schedule. The method further comprises transmitting the output symbols on the corresponding at least one channel, wherein the files are concurrently served at their corresponding rates.

In another embodiment of the invention, a method for serving a file using a server coupled to a data network is provided. The method includes determining a file, wherein the file includes an integer number of compound blocks, wherein each compound block includes at least one basic block, and wherein each basic block includes at least one input symbol. The method additionally includes determining an indication of at least one channel on which to serve the file, and determining a rate at which to serve the file. The method also includes determining a schedule for processing the basic blocks, and generating output symbols for the basic blocks according to the schedule, wherein basic blocks comprising each compound block are generated using a same set of operations. The method further includes assembling basic blocks into compound output symbols, and transmitting the compound output symbols on the corresponding at least one channel, such that the file is served at the corresponding rate.

In another aspect of the invention, a method for recovering a file using a client coupled to a data network is provided, wherein the file includes an integer number of blocks, and wherein each block includes at least one input symbol. The method comprises receiving a plurality of output symbols generated from each of the blocks, and, for each block, storing output symbols corresponding to the block in a fast access memory. The method also comprises, for each block, decoding the output symbols corresponding to the block in place in the fast access memory to recover the block.

In yet another embodiment of the invention, a method for recovering a compound block using a client coupled to a data network is provided, wherein a compound block includes a grouping of one or more basic blocks. The method includes receiving a plurality of compound output symbols generated from the compound block, wherein each compound output symbol includes a plurality of basic output symbols generated from at least one basic block using a same set of operations. The method also includes determining at least one schedule of operations based on the compound output symbols, and for each basic block, applying one of the at least one schedule of operations to the basic output symbols corresponding to the basic block to recover the basic block.

Benefits of the present invention include providing improved serving of one or more files by a server in which the one or more files are served at desired rates. Benefits also include providing more efficient recovery of a file received over a data network.

A further understanding of the nature and the advantages of the inventions disclosed herein may be realized by reference to the remaining portions of the specification and the attached drawings.

BRIEF DESCRIPTION OF THE DRAWINGS

FIGS. 13a and 13b are illustrations of how a file block scheduler may append logical input symbols of value zero to a file partitioned into equal-sized blocks;

FIG. 15 is an illustration of the relative lengths of three files, where each file is broken into blocks of length 1 MB;

FIGS. 28*a*, 28*b*, and 28*c* are illustrations of how compound output symbols received by a client may be stored.

DETAILED DESCRIPTION OF THE INVENTION

The present disclosure references the following applications, the entire disclosures of which are herein incorporated by reference for all purposes:

(1) U.S. Pat. No. 6,307,487, entitled "Information Additive Code Generator And Decoder For Communication Systems") (hereinafter "Luby I");
(2) U.S. Pat. No. 6,320,520, entitled "Information Additive Group Code Generator And Decoder For Communications Systems" (hereinafter "Luby II");
(3) U.S. patent application Ser. No. 09/587,542, filed Jun. 1, 2000 and entitled "Dynamic Layer Congestion Control for Multicast Transport" (hereinafter "Dynamic Layering Application");
(4) U.S. Pat. No. 6,486,803, entitled "On Demand Encoding With a Window" (hereinafter "Windowing Application");
(5) U.S. Pat. No. 6,411,223, entitled "Generating High Weight Encoding Symbols Using a Basis" (hereinafter "High Weight Application").

The above-referenced applications provide teachings of systems and methods that may be employed in certain embodiments according to the present invention. It is to be understood, however, that these systems and methods are not required of the present invention, and many other variations, modifications, or alternatives may also be used.

A file is defined to be a collection of bytes that is to be transferred in its entirety from the server to the client. As used herein, "file" refers to data where the size and length of the data is defined and "stream" refers to data where the size and length of the data is open-ended. Unless otherwise indicated, it should be assumed herein that what is described with reference to files can also be used with reference to streams and vice versa.

A file may be divided into sequentially numbered blocks, where the block index indicates the position of each block. Each block may be further partitioned into an integer number of input symbols. As used herein, the "size" of an object, such as a file or a block should be taken to mean the number of symbols in the object, whereas the "length" of the object refers to number of bytes needed to store the object. The length of an object is equal to its size multiplied by the length of a symbol. The symbol length can be a single bit or 1,000 bytes or more. In one embodiment, all the blocks in a file are roughly the same size and length. In another embodiment, the size and/or the length of each block in a file may vary. In a preferred embodiment, all the input symbols in a block are the same length.

Figure 1A:
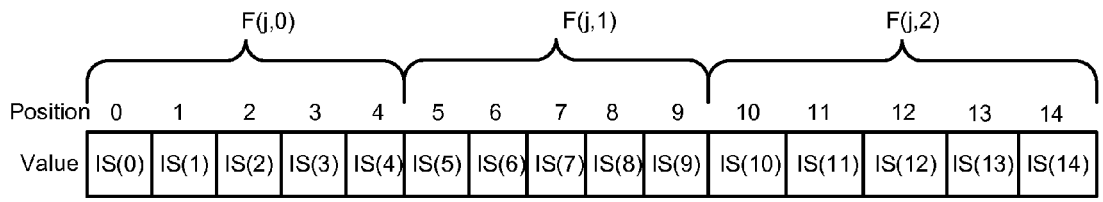
FIGS. 1a and 1b are illustrations of how a file may be divided into blocks, where each block is further partitioned into an integer number of input symbols.
Figure 1B:
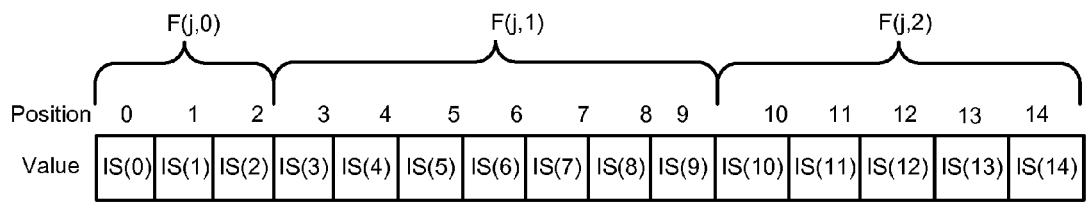

FIG. 1*a* shows a file j comprising 15 input symbols IS(0), IS(1), . . . , IS(14), with each input symbol having a value and a position. The file is partitioned into 3 blocks F(j,0), F(j,1), and F(j,2), where each block comprises 5 input symbols. FIG. 1*b* shows the same file j, where the 3 blocks F(j,0), F(j,1), and F(j,2), now comprise 3, 7, and 5 input symbols, respectively.

Luby I, Luby II, the High Weight Application, and the Windowing Application describe various chain reaction coding systems in detail. As described therein, a chain reaction encoder generates output symbols from input symbols of the input file as needed. Luby I, Luby II, the High Weight Application, and the Windowing Application define and describe various concepts relating to chain reaction coding, and those teachings are incorporated by reference herein rather than restating them here in their entirety. Generally speaking, Luby I, Luby II, the High Weight Application, and the Windowing Application teach how to make and use a chain reaction coding encoder and decoder to transport data, including a process for generating an output symbol or a group of output symbols from selected input symbols.

Luby I, Luby II, the High Weight Application, and the Windowing Application generally describe chain reaction coding systems for an entire input file. In the present invention, the file is broken into blocks. Partitioning a file into blocks has both advantages and disadvantages. Each block is disjoint from the rest of the file, so a block can be encoded or decoded independently, and in parallel with other blocks if desired. Thus, the length and/or size of the blocks may vary. Also, different blocks may be transmitted over different independent channels. Additionally, blocks of an input file may be copied from a memory in which the file is stored to a smaller, faster memory for encoding or decoding of the blocks in the fast memory. This permits much faster encoding or decoding as compared to encoding or decoding over the entire file. In one embodiment, transmitting subsets of blocks over separate channels allows a receiver to download portions of the file and start decoding some blocks, while other blocks are still arriving. The transmission of blocks in a file from a server to a client across a channel in the present invention will be generally described in the context of a chain reaction coding system. However, it is to be understood that the invention is not limited to chain reaction coding systems. Other methods for transmitting the blocks across the channel will be described in more detail below.

The goal of a multiple file transmission system is to serve multiple files at multiple rates. As used herein, the "rate" of an object, such as a file or block should be taken to mean the aggregate length of output symbols transmitted on the set of channels serving the file or block per second. For example, a single file may be served on two or more channels, and each client may subscribe to one or more of the channels according to their available reception rate. The encoder generates a single stream of output symbols at the aggregate rate for the file and the stream is divided among the set of channels, such that each channel is served at the appropriate rate. When a file comprises more than one block, then output symbols from different blocks in the file may be mixed randomly and uniformly in the output stream. This helps to ensure robustness for any loss patterns at the client because the output symbol losses are distributed evenly over the different blocks. When chain reaction codes are used, and output symbols are generated as needed, then an encoder should generate enough output symbols so that each file can be served at the appropriate rate.

Ideally, a server should exhibit the following properties. The server should be able to handle a large variation in file lengths and desired serving rates. The server should use its resources such as memory and processor time efficiently. The server should have the same resource requirements serving a single file at a given rate as it would serving any number of files of the same aggregate length and the same aggregate rate. For example, to serve a 1 GB file at 10 Mbps, the server should use roughly the same amount of resources as serving ten 100 MB files at 1 Mbps each, or five 100 MB files at 1.5 Mbps and two 250 MB files at 1.25 Mbps. The server should also be able to accept new files, stop serving files, or change the rate of one or more of the files currently being served.

System Overview

Figure 2:
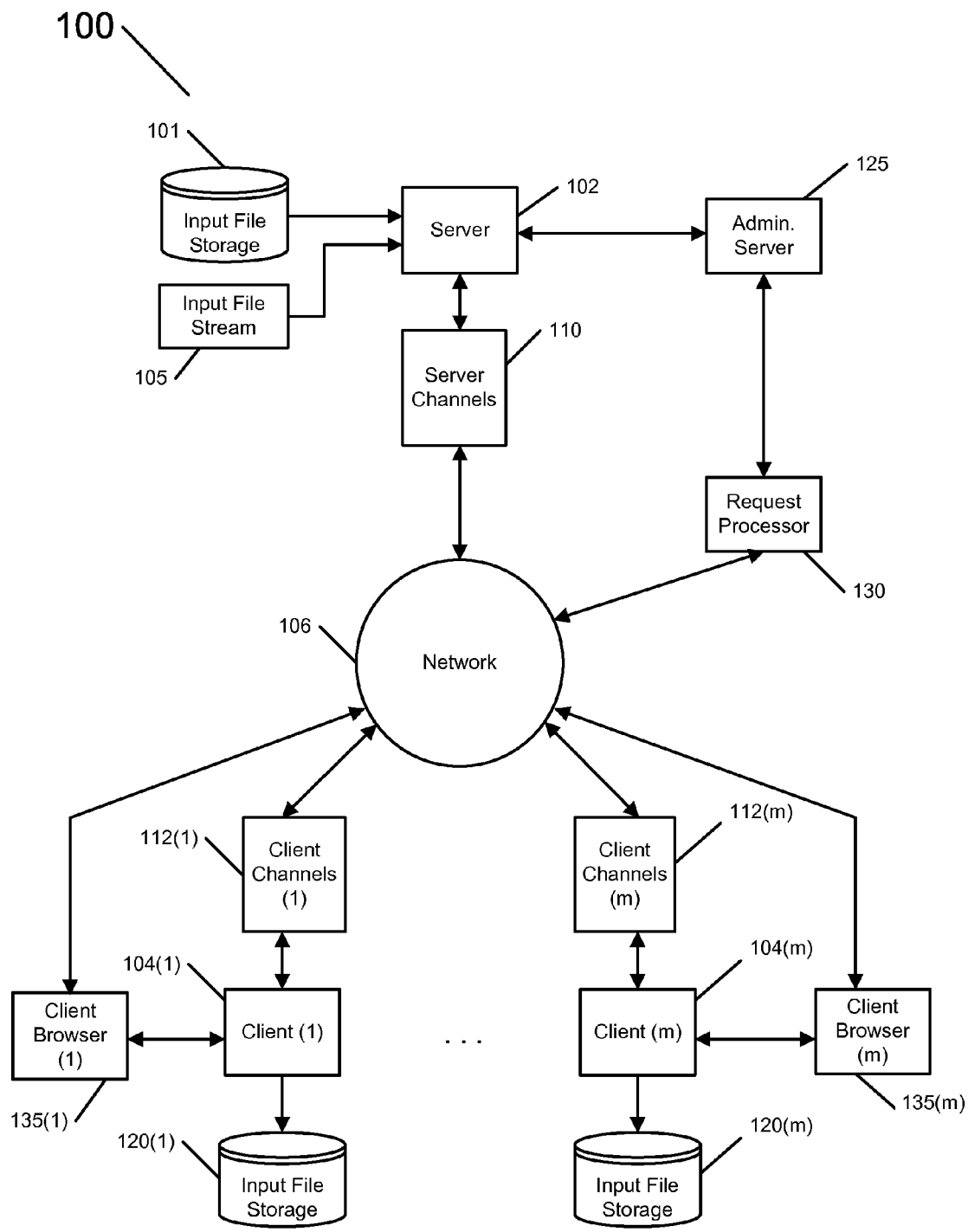
FIG. 2 is a block diagram of a file transmission system with one server and m clients according to one embodiment of the present invention.

FIG. 2 illustrates one embodiment of a file transmission system 100. A server 102 serves files to clients 104 over a network 106. As shown, file transmission system 100 includes m clients, but the actual value of m is not particularly relevant to this description. In a preferred embodiment, network 106 is the Internet, but other networks or subsets of the Internet can be used as well, such as intranets, virtual private networks, LAN's, WAN's, wireless or satellite networks. In fact, network 106 need not be a network in the strictest sense of the term, but may be a collection of point-to-point connections.

However configured, server 102 receives requests for files from clients 104. In FIG. 2, an administrative server 125 may determine a schedule of which files are available. The administrative server 125 may also maintain a list of clients 104 that are eligible to download a particular file. For instance, in a pay-per-download system, the administrative server 125 may maintain a list of clients 104 that have paid and are currently eligible to download a particular file. The administrative server 125 also may control the server 102, and may determine a schedule of which files, or portions of a file are to be served. A list of files currently available for download and any other parameters required by the client 104 may be published by the administrative server 125 at the request processor 130. For instance, the request processor 130 may publish the download rates available, cost, length, and schedule of availability of each file currently being served by the server 102. The server 102, administrative server 125 and request processor 130 may reside on a single machine, separate machines, or some combination thereof.

Only one administrative server 125 and request processor 130 are shown, but it should be understood that other configurations are possible. For instance, in one embodiment a set of servers 102 may be associated with a single administrative server 125 and/or request processor 130. For example, all the servers 102 in one location or all the servers 102 serving the same set of files may be associated with a single administrative server 125. In another embodiment, two or more administrative servers 125 may be associated with a single server 102. For example, one server 102 may have different administrative servers 125 for different subsets of files being served, and/or for different subsets of clients 104. Similarly, one request processor 130 may be associated with multiple administrative servers 125, and multiple request processors 130 may be associated with a single administrative server 125.

The file may be stored in input file storage 101, but may also be an input file stream 105 fed to server 102 from other sources as needed. Only one input file storage 101 and input file stream 105 are shown, but it should be understood that other configurations are possible. For instance, in one embodiment, a set of servers 102 may be fed by the same input file storage 101 and input file stream 105. In another embodiment, a server may be fed by two or more input file storages 101 and input file streams 105.

The client 104 may obtain a list of files available using a client browser 135. The client browser 135 may obtain the list of files from the request processor 130 via the network 106.

Note that the channel used by the client browser 135 may be the same physical channel used by the client 104. Once the client browser 135 requests a particular file from the request processor 130, the client browser 135 may download a file description from the request processor 130 which contains information necessary for the client to begin downloading the file. For example, the file description may include the length, set of download rates, and the set of channels available to download the file. The file description may also include the location of the one or more servers 102 that are currently serving the file. For instance, in a multicast network, the file description may contain a list of multicast groups and the download rate for each multicast group for a file. The client browser 135 may send the file description to the client 104.

In one embodiment, the client browser 135 may be a web browser and the request processor 130 may be a web server. The client browser 135 may receive the file description from the request processor 130 using an http or a similar. However, this is not the only way a client may be alerted to a file becoming available to download. In another embodiment, the request processor 130 may continuously advertise, on a dedicated set of channels, which files are available and the relevant information required by the client to receive them. The client browser 135 may maintain a list of available files, or just listen to a dedicated channel to see what is available based on a user request.

For the purposes of describing some of the system constraints, the connection between a server 102 and network 106 may be modeled as a plurality of server channels 110($i$) and the connection between a client 104($i$) and the network 106 may be modeled as a plurality of client channels 112($i$). The server channels 110 and client channels 112 may be physical and/or logical channels.

In one embodiment, the client 104 and server 102 may be connected via a multicast network. A server may send all packets destined for a particular logical channel to a particular multicast group. The client may join and/or leave a particular logical channel by joining and/or leaving the particular multicast group. A join or a leave message propagates through the network towards the server up to the first router that can service the request. The multicast network may make sure that packets sent to multicast group are received by all the joined clients.

In another embodiment, the client 104 and server 102 may be connected via a unicast network. A server may send all the packets destined for a particular logical channel to a particular unicast address and a particular port. The client may join a particular logical channel by sending a request to receive any packets received by a particular server on a particular port address. The server may make sure that all packets received on a particular port address are copied and sent to all clients that have sent request messages to receive such packets, and thus the server may be an active agent in making the bindings between logical and physical channels.

In another embodiment, the server 102 may be connected to the client 104 via a broadcast network, such as a satellite network. The client 104 may tune its receiver to receive a particular subset of physical channels or receive a single physical channel and filter out all the data except for a particular subset of logical channels, or a combination thereof. In one direction, the physical channel may be a satellite uplink from the server 102 to the network, while the client channel may be a terrestrial link to a local switch in the network. Similarly, the server channels 110 from the network 106 to the server 102 may be terrestrial links, while the server channels 110 from the server 102 to the network 106 may be satellite based. Unless otherwise indicated, where multicasting is referred to herein as a mechanism for scaling the required server and network bandwidths, it should be understood that broadcasting could be used as well.

The logical channels are each shown as bi-directional. Requests may flow from clients 104 towards a server 102, files may flow from input file storage 101 and/or input file stream 105 to a server 102, served file data may flow from a server 102 to clients 104 and files may flow from clients 104 to their associated input file storage devices 120.

A Basic System Implementation

In one embodiment, a single server 102 may serve one or more files to any number of clients. In another embodiment, a single server 102 may only serve a portion of a file to any number of clients, where other servers 102 may serve the rest of the file. For example, one server 102 may serve the even numbered blocks in a file, and a second server 102 may serve the odd numbered blocks. As another example, one server 102 may serve the blocks in the first half of the file, and a second server 102 may serve the blocks in the second half. In yet another embodiment, more than one server 102 may serve the same block in a file. For example, two or more servers 102 at different geographic locations in the network may serve a file, or overlapping portions of a file, concurrently. Additionally, clients 104 can download from one or more servers 102 concurrently. Multiple servers 102 at the same or different locations in the network make a file transmission system 100 more reliable in the event portions of the network, or some of the servers 102 fail. One skilled in the art will recognize many other combinations, variations, and alternatives to the above embodiments and examples.

In one embodiment, a client 104 may receive the same or disjoint portions of a file from one or more servers 102. For example, a client 104 may download a file from the nearest available server 102, or from a server, among the servers 102 currently serving the block, with the lowest aggregate load of clients 104. As another example, the client 104 may decide from which server 102 to download a file, or a portion of a file, based on its current reception rate from that server 102. In another embodiment, the client 104 may add or remove servers 102 from which it is downloading. For example, a client 104 may try to download a portion of a file from a second server 102 concurrently if there is congestion in the network. As another example, a client 104 may download a portion of a file from a second server 102 due to failure of, lost communication with, etc., a first server 102 from which it was downloading the portion of a file.

Figure 3:
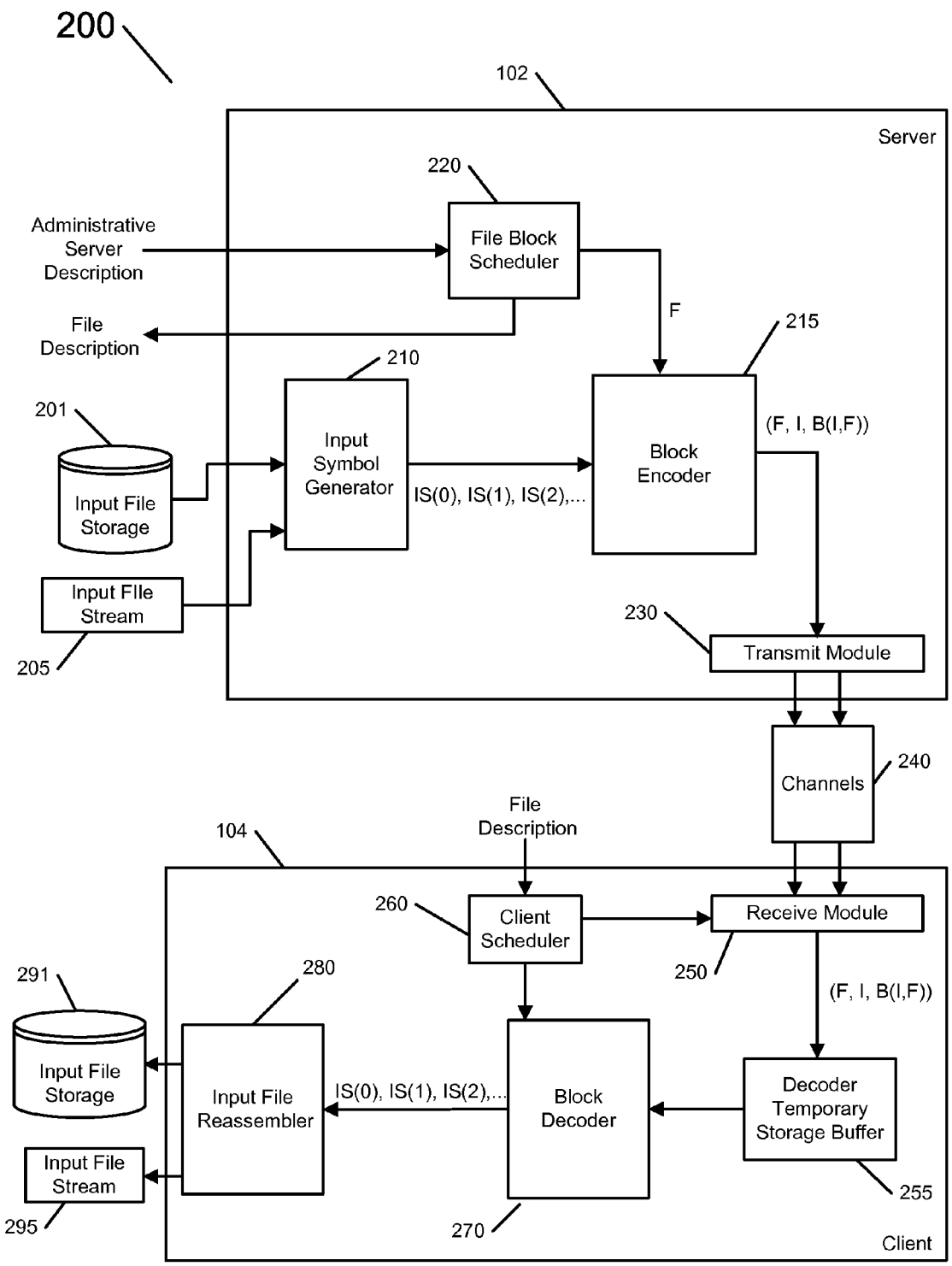
FIG. 3 is a block diagram of a file transmission system with a single server and a single client according to one embodiment of the present invention.

FIG. 3 is a block diagram of a basic file transmission system 200 comprising a single server 102 and a single client 104, connected by a plurality of channels 240. Here, for simplicity, the server channels 110, network 106 and client channels 112 have been combined into a single set of channels 240. As stated before, these channels 240 may be physical channels or logical channels. In the system 200, a file residing in input file storage 201, or forming an input file stream 205, may be provided to an input symbol generator 210. Input symbol generator 210 may generate a sequence of one or more input symbols (IS(0), IS(1), IS(2), . . . ) from the file or stream, with each input symbol having a value and a position (denoted in FIG. 3 as a parenthesized integer). The output of input symbol generator 210 is provided to a block encoder 215.

File block scheduler 220 receives as input the administrative server description of the file and generates a file description for the request processor 130. In one embodiment, the functionality of the file block scheduler 220 may be performed by the administrative server 125. One function of the file block scheduler 220 may be to partition the file into a set of blocks, where each block has an associated length, rate and set of channels to be served on. Each block may be identified by a unique block index F.

In one embodiment, every block in a file is served at a same rate on all the channels serving the file. If the file is an input file stream 205, then the file block scheduler 220 may partition the file as the data arrives. The rate and set of channels to serve each block or file may vary over time. For example, in a multicast network, a dynamic layering scheme may be used to serve each block or file. The Dynamic Layering Application describes various dynamic layering schemes that may be used. It is to be understood, however, that many other types of dynamic layering schemes may also be used. Moreover, other methods in addition to dynamic layering schemes may also be used to serve each block or file.

The size, rate and set of channels to serve each block of the file may serve as the input to the file block scheduler 220. Where chain reaction codes are used, if output symbols are generated on the fly, then the file block scheduler 220 should ensure that there are enough output symbols generated for each block so that each block can be served at the appropriate rate. In one embodiment, the file block scheduler 220 may determine how many output symbols from each block are to be generated by the block encoder 215. In another embodiment, the transmit module 230 may determine how many output symbols from each block are to be generated by the block encoder 215. For example, the transmit module 230 may allocate a temporary storage buffer to store output symbols for each block, where the number of output symbols generated for a block is the number of output symbols required to fill the buffer allocated for that block.

The block encoder 215 provides output symbols to the transmit module 230. Each output symbol may be generated as a function of input symbols from a single block or subset of blocks. The block, or set of blocks, from which input symbols are chosen to generate an output symbol will be referred to as the blocks associated with that output symbol. In a specific embodiment, each output symbol is associated with only one block. Transmit module 230 may also be provided the set of blocks associated with each such output symbol. In embodiments in which keys are used to generate output symbols, a key may be provided to transmit module 230.

Transmit module 230 transmits the output symbols over a plurality of channels 240 to a receive module 250. If a keying method is used and depending on the keying method used, transmit module 230 may also transmit some data about the keys of the transmitted output symbols, or the associated blocks. In one embodiment, transmit module 230 stores the output symbols in a temporary storage buffer before transmission, which allows the transmit module 230 to transmit output symbols in an order that is different from the order in which transmit module 230 receives the output symbols. Transmit module 230 may transmit each block on a different channel, on multiple channels, or subsets of blocks on different channels. In one embodiment, the transmit module 230 may transmit each of the blocks in a file on all the channels serving the file.

In one embodiment, block encoder 215 is a chain reaction encoder as described below. In another embodiment, the original symbols are encoded by block encoder 215 using a forward error correcting (FEC) code, such as a Reed-Solomon code, a Tornado code, or the like, rather than using a chain reaction code. These codes have a fixed number of encoded symbols so if there is sufficient storage available at the server, the block encoder 215 need only generate each output symbol once and store it, where the encoded symbols may be generated prior to the start of transmission, or as needed by the transmit module 230. The encoded symbols may then be broadcast repeatedly by transmit module 230 either in a looping manner, or by choosing a random output symbol each time. It is important to design the system so that a client receives a minimal number of duplicate packets. The system works well using a chain reaction encoder because the client may concurrently download encoded data from multiple servers without coordination and not receive redundant data. An additional advantage of chain reaction codes is that they offer a greater amount of protection and flexibility in system design against loss compared to a FEC code that has been designed for a fixed loss rate.

Receive module 250 receives the output symbols from the plurality of channels and determines the key I (if a keying method is used) and block F associated with each output symbol. In one embodiment, the receive module may use information explicitly transmitted with each output symbol to determine the key and the block for each output symbol. In another embodiment, receive module 250 may use timing information, or information about the channel an output symbol was received on, in order to calculate the key I, or the block F for that output symbol. Receive module 250 provides the output symbols and their associated block and key to a decoder temporary storage buffer 255. In one embodiment, the decoder temporary storage buffer 255 is a component of the block decoder 270. In another embodiment, the decoder temporary storage buffer 255 is a component of the receive module 250.

A client scheduler 260 receives the file description from the client browser 135. The client scheduler 260 may determine when to join and leave channels, and when to have the block decoder 270 reassemble a block. In one embodiment, the client scheduler 260 uses feedback from the block decoder 270 and receive module 250 in order to determine these actions. For instance, in the presence of loss, or if the client varies its reception rate by joining and leaving channels over time in the presence of congestion, the client scheduler 260 may wait for the receive module 250 to indicate that enough output symbols from a particular channel, or for a particular block, have been received before issuing a command to the receive module 250 to leave a channel, or for the block decoder 270 to reassemble a block. In another embodiment, the client scheduler 260 uses timing information from the file description to determine which channels to join and leave and when to reassemble a block.

The block decoder 270 receives a signal from the client scheduler 260 to reassemble a block. The block decoder 270 loads the block F to be reassembled from the decoder temporary storage buffer 255, and may use the keys together with the corresponding output symbols, to recover the input symbols (again IS(0), IS(1), IS(2), ... ). Block decoder 270 provides the recovered input symbols to an input file reassembler 280, which generates a copy for input file storage 291, or an input file stream 295.

A Basic Block Encoder

The block encoder 215 is coupled to receive outputs from an input symbol generator 210 and a file block scheduler 220 and has an output for output symbol values. The block encoder 215 takes a block index as input from the file block scheduler 220 and generates a row of output symbols for the block as output to the transmit module 230. The row length may be determined by the transmit module 230, the file block scheduler 220, or some other component.

Figure 4:
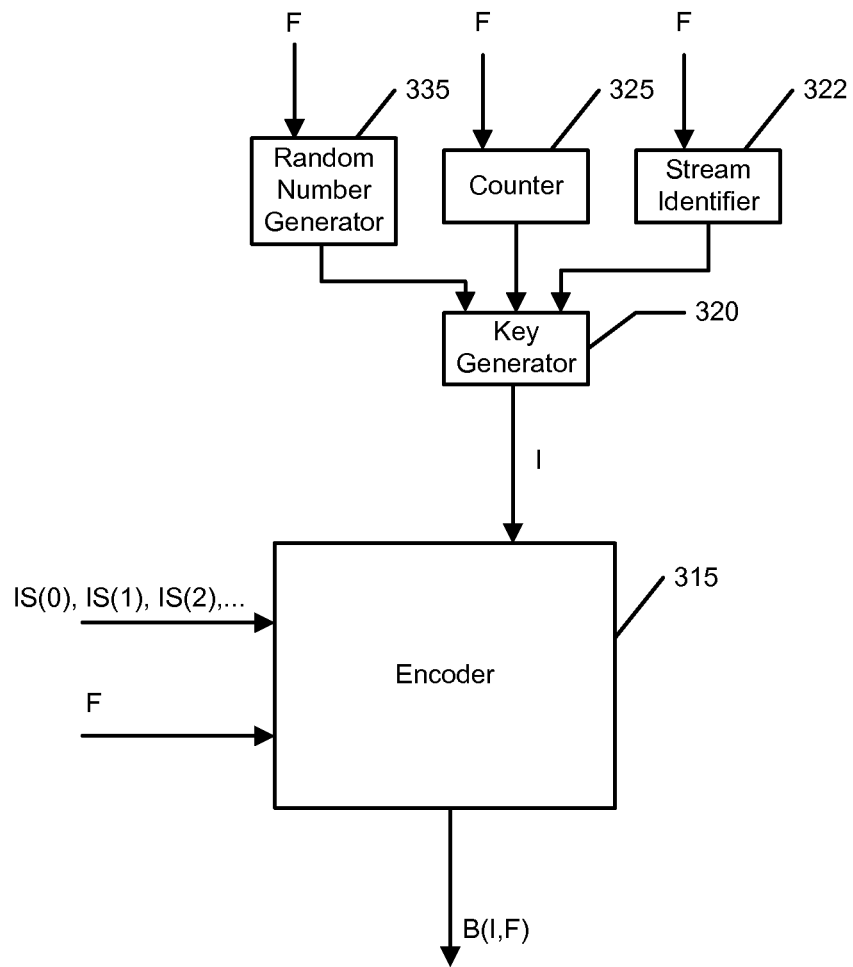
FIG. 4 is a block diagram of a block encoder as may be used in the file transmission system shown in FIG. 3.

FIG. 4 shows a basic block encoder 215 for a file transmission system using chain reaction codes. The block encoder 215 comprises a random number generator 335, counter 325, stream identifier 322, key generator 320 and encoder 315.

Key generator 320 generates a key for each output symbol to be generated by encoder 315. Key generator 320 may use a combination of the output of a counter 325, a unique stream identifier 322, and/or the output of a random number generator 335 to produce each key. The counter 325, random number generator 335 and stream identifier may all have a block index F as input. In one embodiment, each key may be generated independently of the block index F, and the same key may be used multiple times for different blocks within a file, or for different files. However, it is to be understood that the same key need not be used on multiple different blocks. The output of key generator 320 is provided to the encoder 315. Using each key I provided by key generator 320 and block index F, the encoder 315 generates an output symbol, with a value B(I,F). The value of an output symbol is generated based on its key and on some function of one or more input symbols in the block F provided by the file block scheduler 220. In one embodiment, a heavy weight basis is associated with each block so that output symbols of large weight may be generated more efficiently. The High Weight Application provides further details on generating output symbols using a basis. It is to be understood, however, that many other methods of generating large weight symbols using a basis may be used. Moreover, many other methods may be used to generate large weight symbols. The input symbols used in generating an output symbol are referred to herein as the output symbol's "associated input symbols".

Figure 5:
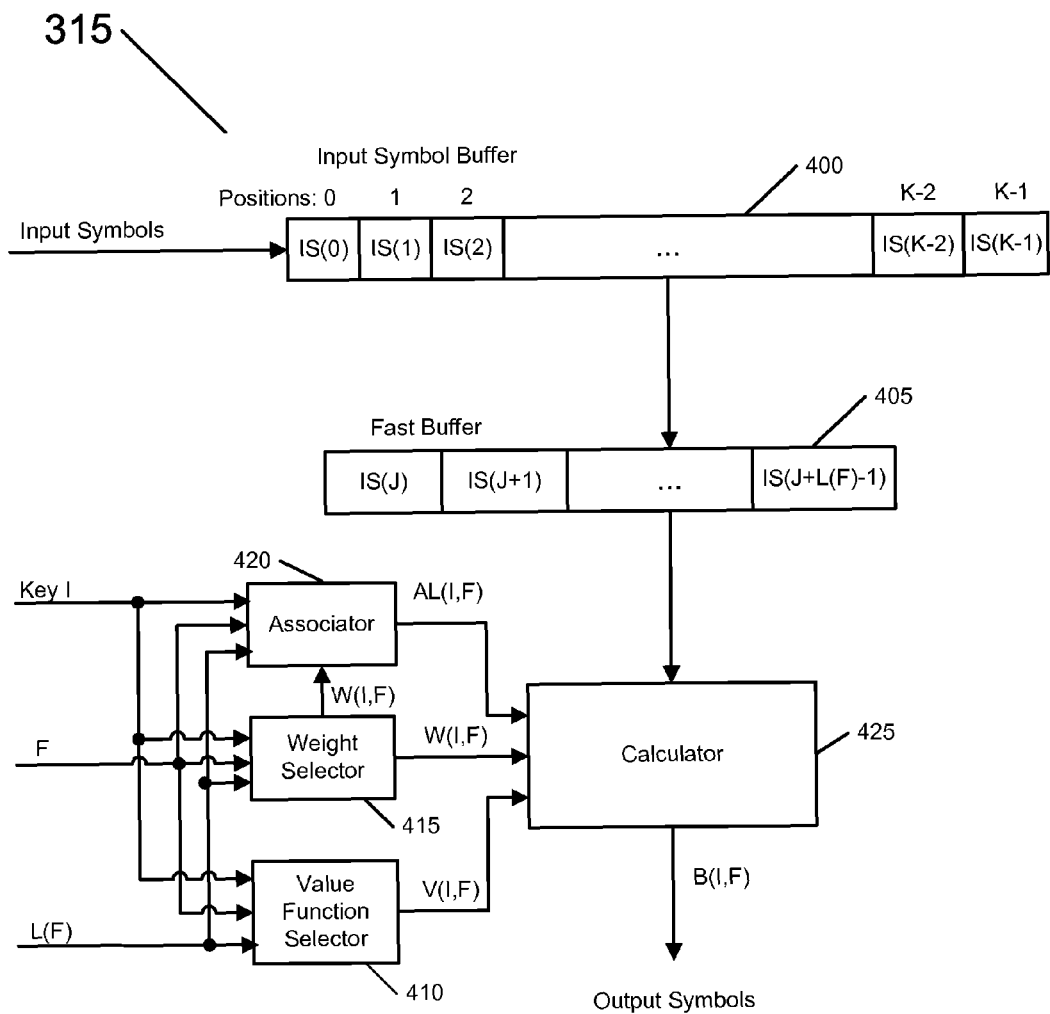
FIG. 5 is a block diagram of an encoder as may be used in the block encoder shown in FIG. 4.
Figure 6:
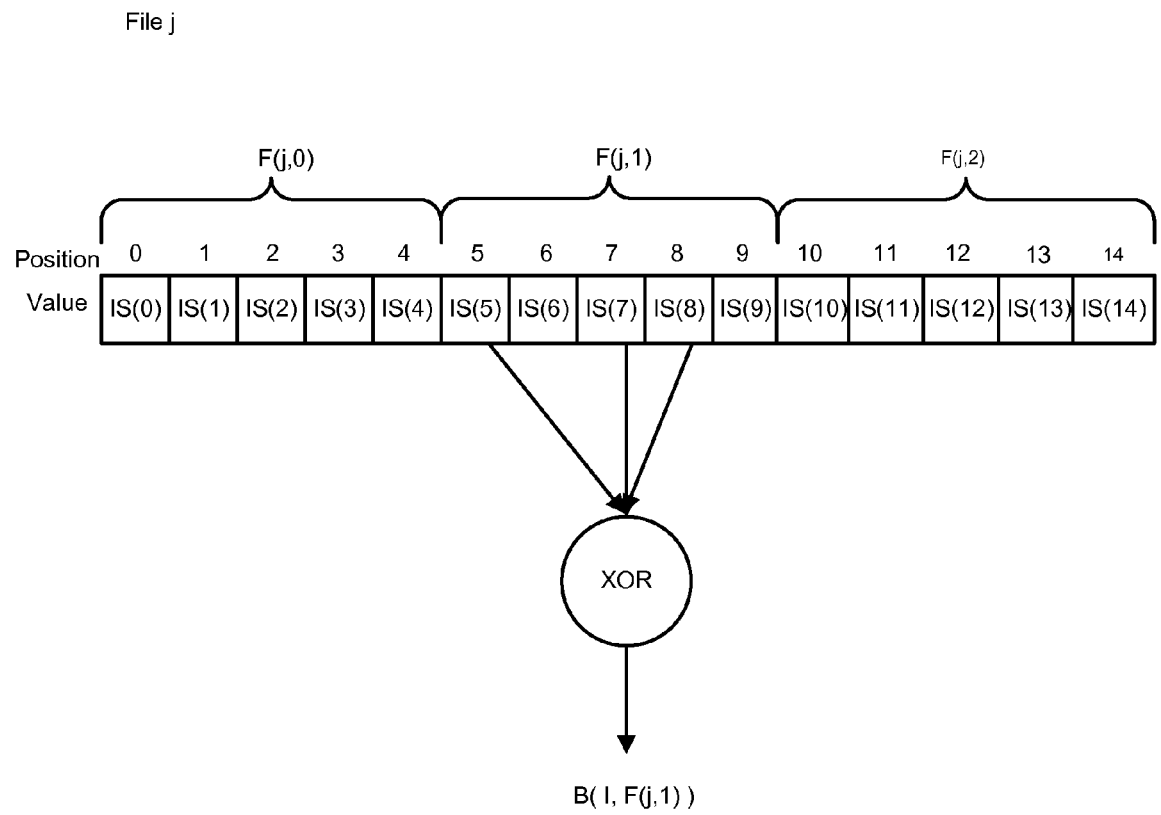
FIG. 6 is an illustration of how an output symbol may be generated from a set of associated input symbols.

FIG. 5 is a block diagram of one embodiment of encoder 315 shown in FIG. 4. The block diagram of FIG. 5 is explained herein with references to FIG. 6, which is a diagram showing the logical equivalent of some of the processing performed by the encoder 315.

Encoder 315 is provided with input symbols from a fast buffer 405, and an input symbol buffer 400 as well as a key I and a block F for each output symbol it is to generate. As shown, L(F) input symbols in order of position are stored in fast buffer 405, where L(F) is the number of input symbols in block F and the first input symbol in block F occurs at position J. Also, while the size L(F) of the block is expressed here as a function of the block index F, it should be understood that in some variations, L(F) is fully determinable from the block F, while in other variations L(F) is a function of other values as well, or is independent of F. In one embodiment L(F) is the same for all the blocks in a file.

The input symbols may be read, as needed, from the input symbol buffer 400 into the fast buffer 405. In a specific embodiment, fast buffer 405 would be a storage medium with a faster access time than input symbol buffer 400. For example, fast buffer 405 may be implemented in RAM while input symbol buffer 400 may be stored in disk storage. As another example, fast buffer 405 may be implemented in processor cache while input symbol buffer 400 may be stored in RAM. In this embodiment, as many as possible of the input symbols should be in fast buffer 405 when the calculator 425 is invoked, balancing the time savings of invoking the calculator 425 when many symbols are in fast buffer 405 with the time it takes to move input symbols from the input symbol buffer 400 to fast buffer 405.

Key I (provided by key generator 320 shown in FIG. 4) and block F (provided by file block scheduler 220 shown in FIG. 3) are inputs to value function selector 410, weight selector 415 and associator 420. The number of input symbols L(F) in block F may also be provided to these three components 410, 415 and 420. A calculator 425 is coupled to receive outputs from value function selector 410, weight selector 415, associator 420, input symbol buffer 400 and the fast buffer 405, and has an output for output symbol values. It should be understood that other equivalent arrangements to the elements shown in FIG. 5 may be used, and that this is but one example of an encoder according to the present invention.

Using I, F, and possibly L(F), weight selector 415 determines the number W(I,F) of input symbols that are to be "associates" of the output symbol having key I. In one variation, W(I,F) is chosen based on I but is not based on F. Once the number W(I,F) is determined, weight selector 415 supplies the number to associator 420 and to calculator 425 if needed.

Using I, F, W(I,F) and possibly L(F), associator 420 determines a list AL(I,F) of the W(I,F) positions of input symbols selected among the L(F) symbols in block F to be associated with the current output symbol. It should be understood that W(I,F) need not be separately or explicitly calculated if associator 420 can generate AL(I,F) without knowing W(I,F) ahead of time. Once AL(I,F) is generated, W(I,F) can be easily determined because it is the number of associates in AL(I,F). It should also be understood that not all of the input symbols used by the calculator need be in fast buffer 405, as some or all of the input symbols may be obtained from input symbol buffer 400. Preferably, as many input symbols as possible can be obtained from the fast buffer 405. In some embodiments, the number L(F) of input symbols in block F is used by the encoder 315 to select the associates. The value L(F) may also be used by the encoder 315 to allocate storage for input symbols in the fast buffer 405.

Once I, W(I,F) and AL(I,F) are known and available to calculator 425, then calculator 425 accesses the W(I,F) input symbols referenced by AL(I,F) in fast buffer 405, or in input symbol buffer 400 (if the needed input symbols are not present in fast buffer 405), to calculate the value B(I,F) for the current output symbol. Calculator 425 calculates the value B(I,F) of the output symbol based on a value function V(I,F), if a variable value function is used. One property of a suitable value function is that it would allow the value for an associate in AL(I,F) to be determined from output symbol value B(I,F) and from the values for the other W(I,F)–1 associates in AL(I,F). One preferred value function used in this step is the XOR value function, since it satisfies this property, is easy to compute and is easy to invert. However, other suitable value functions may be used instead. Luby II describes, for instance, a system in which a group of output symbols is generated using a Reed-Solomon value function. Moreover, Luby II describes other value functions that may also be used, including methods based on polynomials over finite fields, methods based on linear systems of equations, methods based on Cauchy matrices over finite fields, and other maximum distance separable (MDS) codes (of which Reed-Solomon codes are examples).

If used, value function selector 410 determines a value function V(I,F) from key I, and possibly F and L(F). In one variation, the value function V(I,F) is the same value function V for all I and F. In that variation, value function selector 410 is not needed and calculator 425 can be configured with the value function V. For example, the value function may be XOR for all I, i.e., the output symbol value is an XOR (exclusive OR) of the values of all of its associates.

Encoder 315 then outputs B(I,F). In effect, encoder 315 performs the action illustrated in FIG. 6, namely, to generate an output symbol value B(I,F) as some value function of selected input symbols. In the example shown, the value function is XOR, the weight W(I,F) of the output symbol is 3, the block index F is F(j,1), i.e., the second block of file j, the block starts at position J=5, the size L(F) of the block is 5, and the associated input symbols (the associates) are at positions 5, 7, and 8 with respective values IS(5), IS(7) and IS(8). Thus, the output symbol is calculated as B(I,F)=IS(5) XOR IS(7) XOR IS(8) for that value of I and F.

In some embodiments, there may be a minimum number of output symbols generated for each block processed, i.e., for each input of the block index to the block encoder 215. For example, there may be a minimum time associated with processing a block, which limits the frequency that each block can be processed. For instance, the minimum time may be the time to load a block into fast access memory, or the time to compute a key I, the weight W(I) and a list AL(I) of W(I) input symbol positions for an output symbol.

Similarly, in some embodiments, there may be a maximum number of output symbols generated for each block processed by the block encoder 215. For example, the maximum number of output symbols for a block may be determined by the maximum length allocated in the temporary storage buffer for a block within the transmit module 230. In other embodiments, there may be a maximum aggregate length of output symbols generated for each block processed by the block encoder 215. For example, the maximum aggregate length of output symbols generated for a block may be determined by the maximum length allocated in the temporary storage buffer for a block within the transmit module 230.

As described above, the file transmitted from a server 102 to a client 104 is preferably encoded using chain reaction coding. The operation of several variations of a chain reaction coder are described in more detail in Luby I, Luby II, the High Weight Application, and the Windowing Application and rather than describe those in great detail here, those references are incorporated herein. In another embodiment, the input symbols are encoded by block encoder 215 using a FEC code rather than a chain reaction code. In one embodiment, the coding can be done ahead of time, in which case the encoded output symbols for the file could be stored in the temporary storage buffer in the transmit module 230. In a preferred embodiment, the encoding can be done by the servers 102 as needed, with the block encoder 215 continuously generating new output symbols at the appropriate rate for each block.

A Basic Transmit Module

The transmit module 230 (shown in FIG. 3) is coupled to receive rows of output symbols from the block encoder 215 and has an output for packets to the channels 240. The transmit module 230 transmits output symbols across the channel at the appropriate rate for each file. In one embodiment, the transmit module 230 is required for rate control since output symbols may not take a uniform amount of time to compute.

Figure 7:
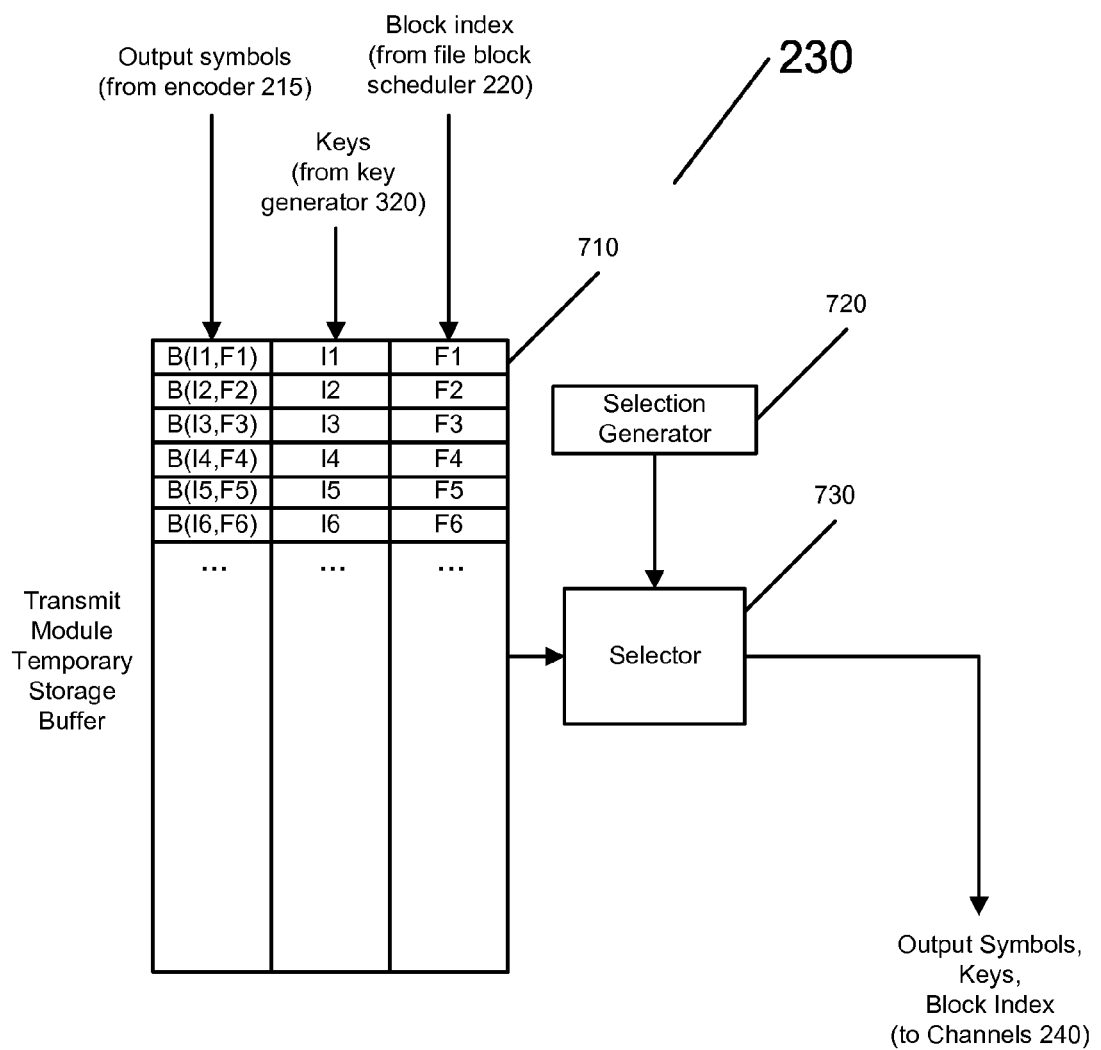
FIG. 7 is a block diagram of a transmit module as may be used in the file transmission system shown in FIG. 3.

FIG. 7 shows a basic transmit module for a file transmission system. The block diagram of FIG. 7 is explained herein with references to FIG. 8, which is a diagram showing the logical equivalent of some of the processing performed for a single file by the transmit module 230.

Figure 8:
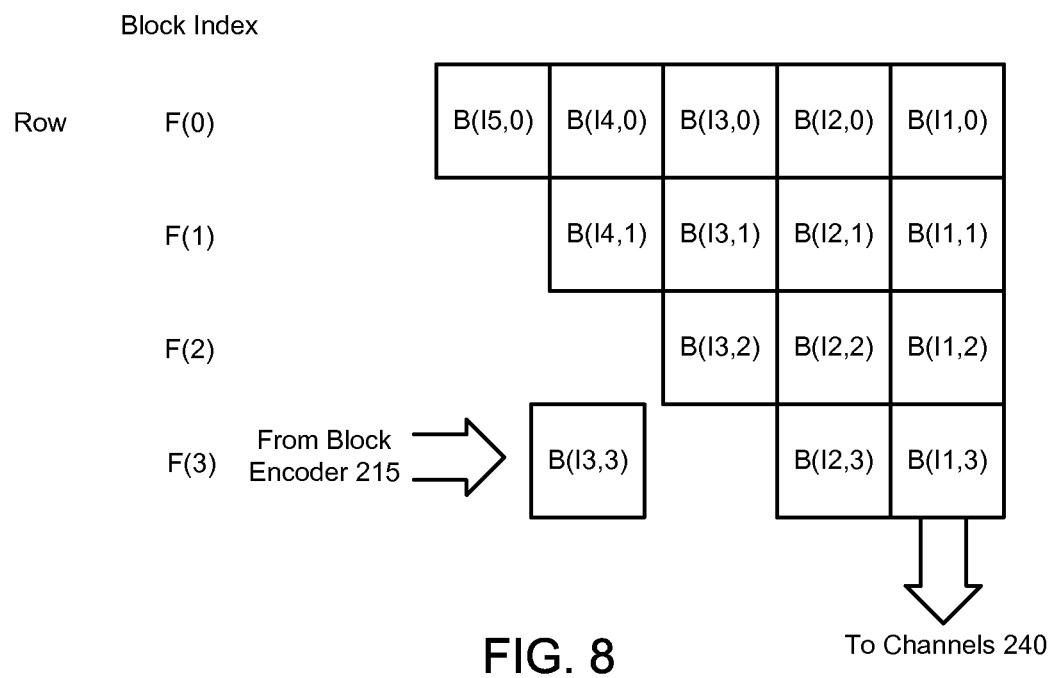
FIG. 8 is an illustration of how output symbols for each block in a file may be generated by row and transmitted by column.

The transmit module 230 comprises a transmit module temporary storage buffer 710, selection generator 720, and selector 730. As shown there, the output symbols, keys, and block indices are stored in a transmit module temporary storage buffer 710 and extracted from the buffer according to selection values provided from a selection generator 720 to a selector 730. In one embodiment, the transmit module temporary storage buffer 710 is partitioned into rows where each block of a file corresponds to a row. For example, FIG. 8 shows a portion of a transmit module temporary storage buffer 710 comprising 4 rows for blocks F(0), F(1), F(2) and F(3). In some variations, the length of each row may be dependent on the length of a file, the rate of a file, and/or the number of blocks in a file, while in other variations, the row length may be dependent on other values as well. In one embodiment, all the blocks in a file are assigned the same row length. The row lengths of different files may vary.

Each time a block is processed by the block encoder 215, enough output symbols are generated to fill the row in the transmit module temporary storage buffer 710 associated with that block. For example, if the row of a block in the transmit module temporary storage buffer 710 is empty, then the block encoder 215 generates a row's length worth of output symbols for that block. FIG. 8 shows how the row for block F(3) is filled by output symbols from the block encoder 215. The row length for each block should be large enough, so that each file can be served at the appropriate rate because the row length determines the frequency a block should be scheduled by the file block scheduler 220.

When the selection generator 720 selects a block for which to transmit an output symbol, the selector 730 selects an output symbol in the row corresponding to that block. In one embodiment, the selector 730 selects the output symbols for a block in the order in which they are generated, and thus the output symbols for the block are transmitted in a queue-like manner. In another embodiment, the selector 730 selects the output symbols for a block in a stack-like manner, i.e., the next output symbol transmitted for a block is the last output symbol placed in the buffer row for that block. In yet another embodiment, the selector 730 selects the next output symbol to be transmitted for a block according to a random or a pseudo-random function from among the set of output symbols in the buffer row for that block.

In one embodiment, the selector 730 extracts an output symbol, a key and/or a block index for transmission across the channel in a packet. In another embodiment, only an output symbol is transmitted in the packet across the channel, and the client 104 uses timing information and/or the channel on which it receives a packet in order to determine the key and/or block index for the output symbol. Alternatively, two or more output symbols are transmitted in the packet. For instance, a packet may include two or more output symbols from one block, output symbols from two or more blocks, or a combination thereof.

In one embodiment, the selection generator 720 selects the block for which the next output symbol is to be transmitted across the channel according to a random (or a pseudo-random) function from the blocks in a file. In another embodiment, the selection generator 720 selects the output symbols for a file to be transmitted across the channel on a column-by-column basis from the rows of output symbols as shown in FIG. 8. Here, the output symbols are generated row-by-row but transmitted column-by-column, and thus the output symbols are row-to-column interleaved for transmission across the channels. From FIG. 8, the output symbols are selected by the selection generator 720 in the order B(I1,3), B(I1,2), B(I1,1), B(I1,0), B(I2,3), etc. In a preferred embodiment, selection generator 720 may permute the output symbols within a column, or within a number of columns, before selecting them. The output symbols are row-to-column interleaved (and possibly permuted) so that output symbols from different blocks in a file are mixed uniformly in the output stream.

Storing the Transmit Module Temporary Storage Buffer on One or More Disks

Referring again to FIG. 7, in one embodiment, the transmit module temporary storage buffer 710 is stored on one or more disks. For example, the aggregate buffer space required for the set of files being served may be too large to fit in RAM, or other fast access memory. In a preferred embodiment, if the transmit module temporary storage buffer 710 is stored on one or more disks, then output symbols in the buffer that comprise a packet payload are packet aligned. Particularly, the one or more disks may be accessed in units of pages. Thus, output symbols stored in the buffer that comprise a packet payload should be stored such that a minimum number of page accesses are required in order to access all the output symbols comprising a packet payload. For example, if a page length is 4 KB, and the packet payload length is a power of 2, then either an integer number of consecutive packet payloads will comprise a page, or a packet payload will comprise an integer number of pages. In this example, in order for a packet payload to be packet aligned, the start of a page should correspond to the start of a packet payload.

Referring now to FIGS. 3 and 7, if the transmit module temporary storage buffer 710 is stored on two or more disks, the transmit module 230 may interleave read/write operations to the disks. For example, the transmit module 230 may read one or more output symbols for transmission across the channels 240 from a first disk, while it writes a row's length worth of output symbols generated for a block to a second disk.

The transmit module 230 can be made more robust in the presence of disk failure by storing the row for a block on two or more disks. In the event a disk fails, the transmit module 230 may continue serving that block by reading the row on one or more of the other disks, without having to immediately generate more output symbols for that block. For example, if the transmit module temporary storage buffer 710 is stored on M disks, then a fraction 1/M of the row length for each block may be stored on each of the disks. In another embodiment, the transmit module temporary storage buffer 710 may store an entire row length of output symbols for a block on one disk, and each time the block encoder 215 generates a row length of output symbols for a block, the transmit module temporary storage buffer 710 writes the output symbols to one of the available disks. For example, the disk may be chosen in a round robin manner from among the set of disks. As another example, the disk may be chosen based on which disk in the set of disks is not currently in use.

There is an important trade-off between the page length of a read/write operation on a disk, and how small a fraction of a row length is stored on each disk. For example, if the page length is 4 KB, and the aggregate row length for a block is 16 KB, then it may be more efficient (in terms of disk access time) to store a row of output symbols in the transmit module temporary storage buffer 710 on four disks, instead of increasing robustness in the presence of disk failure by storing the same row on five disks, where each disk contains less than 4 KB of output symbols for the row.

In one embodiment, the transmit module temporary storage buffer 710 and the input symbol buffer 400 (shown in FIG. 5) comprise the same disk, or set of disks. If the transmit module temporary storage buffer 710 and the input symbol buffer 400 are stored on two or more disks, the block encoder 215 and the transmit module 230 may cooperate, or interleave, their read/write operations to the disks. For example, the transmit module 230 may write a row lengths worth of output symbols generated for a block to a first disk, while another block is read from the input symbol buffer 400 to the fast buffer 405 from a second disk. As another example, the transmit module 230 may read one or more output symbols for transmission across the channels 240 from a first disk, while the block encoder 215 reads a block of input symbols from the input symbol buffer 400 to the fast buffer 405 from a second disk.

A Basic Receive Module

Figure 9:
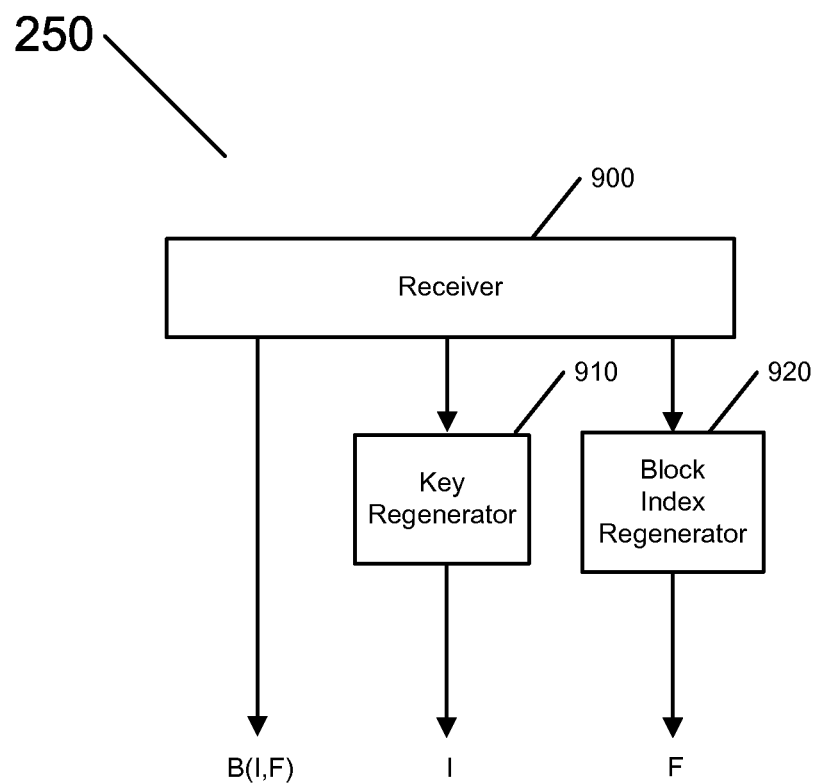
FIG. 9 is a block diagram of a receive module as may be used in the file transmission system shown in FIG. 3.

Referring now to FIGS. 3 and 9, FIG. 9 shows a basic receive module 250. The receive module 250 comprises a receiver 900, a key regenerator 910 and a block index regenerator 920. Receiver 900 processes the data received on the channels 240 and provides the output symbols to a decoder temporary storage buffer 255. Data that receiver 900 receives about the keys of these output symbols is provided to a key regenerator 910, and data that receiver 900 receives about the block index is provided to a block index regenerator 920.

Key regenerator 910 regenerates the keys for the received output symbols and provides these keys to decoder temporary storage buffer 255. Block index regenerator 920 regenerates the block index for the received output symbols and provides these block indices to decoder temporary storage buffer 255. In one embodiment, decoder temporary storage buffer 255 will store all the output symbols for the same block in a contiguous portion of the buffer. For instance, for a file comprising J blocks, the decoder temporary storage buffer 255 may contain J disjoint portions of contiguous buffer space, where output symbols from a particular block are stored in buffer space reserved exclusively for that block. In another embodiment, the buffer space for a block may be reused once that block has been processed by the block decoder 270 in order to minimize the required amount of decoder temporary storage buffer 255.

The key regenerator 910 and block index regenerator 920 may determine the key and block index respectively for each output symbol in a packet in a number of ways. For example, each output symbol in the packet may be transmitted along with its key and associated block. As another example, a number of output symbols in a packet may be associated with a single block, where the block index is also contained in the packet. Here, a single key may be received for the plurality of output symbols in the packet, where the key for each of the output symbols in the packet is obtained as a function of the key sent in the packet. For example, the key for a first output symbol may be the original key received in the packet, and the key for additional output symbols in the same packet may be computed by applying a pseudo-random function to the key, where the pseudo-random function is the same as the function used by the server to compute the keys for generating the output symbols. In another embodiment, output symbols from different blocks in a same packet may share a common key. In yet another embodiment, the block index or the key may be a function of the ordering of the output symbol within the packet.

Pipelining and Memory Usage at the Encoder

In one embodiment, the fast buffer 405 (shown in FIG. 5) comprises enough memory to store two or more blocks. In this embodiment, the encoder 315 may use pipelining to improve the efficiency of the encoding process. For example, the encoder 315 may read the next block or blocks to be encoded from the input symbol buffer 400 to the fast buffer 405, while a current block is being encoded.

Figure 10A:
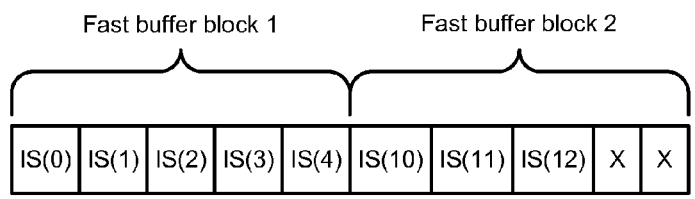
FIGS. 10a and 10b are illustrations of how memory access for a block encoder may be pipelined.

FIG. 10 shows two illustrations of how the encoder 315 may use pipelining to improve the efficiency of the encoding process. FIG. 10*a* shows a fast buffer 405 comprising enough memory to store two blocks comprising five input symbols in each. In this embodiment, the encoder 315 is generating output symbols for a block in fast buffer block 1, while a second block is being loaded into fast buffer block 2 in parallel. An X in a position indicates that an input symbol from a block has not yet been read into the fast buffer block. Once the encoder 315 completes generating output symbols for the block in fast buffer block 1, and loading the second block into block in fast buffer block 2, the encoder 315 then starts generating output symbols for the block in fast buffer block 2, while a third block is being loaded into fast buffer block 1 in parallel. In general, the encoder 315 alternates between loading and encoding blocks in both fast buffer block 1 and fast buffer block 2. In a preferred embodiment, the time spent loading a block into a fast buffer block is roughly the same as the time spent generating output symbols for a block.

Figure 10B:
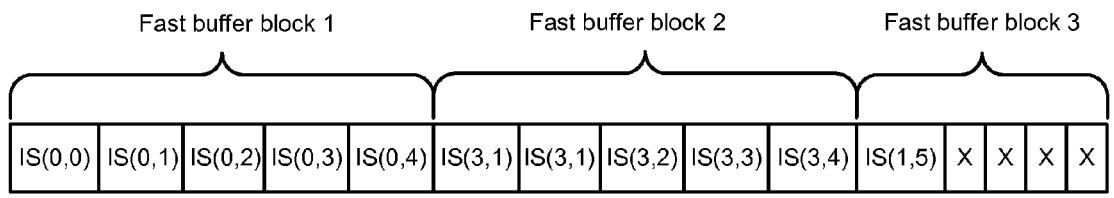

FIG. 10*b* shows a fast buffer 405 comprising enough memory to store three blocks comprising five input symbols in each. In this embodiment, the encoder 315 is generating output symbols for the block in fast buffer block 1, the next block to be encoded has been loaded into fast buffer block 2, while a third block is being loaded into fast buffer block 3 in parallel. In one embodiment, the encoder 315 alternates between loading and encoding blocks in the fast block buffers in a round robin manner. Where blocks vary in length, and/or the aggregate length of output symbols generated varies for different blocks, it may be more efficient to have more than three fast buffer blocks, so that when the encoder 315 completes processing a block, there is a second block already loaded into a fast buffer block available to be processed. For example, a larger number of fast buffer blocks may allow for greater variations in the loading or encoding times of the encoder 315 for the different blocks, without periods of waiting for either a new block to be loaded into fast buffer 405, or for the encoder 315 to complete generating output symbols for a block. A larger number of fast buffer blocks may also allow blocks to be encoded in parallel. In yet another embodiment, the block index or the key may be a function of the ordering of the output symbol within the packet.

Pipelining and Memory Usage at the Decoder

Referring again to FIG. 3, in one embodiment, the block decoder 270 comprises one or more decoder buffer blocks, i.e., memory to store one or more blocks for decoding. For example, the block decoder 270 may load a block to be decoded from the decoder temporary storage buffer 255 into a decoder buffer block. In this embodiment, the block decoder 270 may decode the block "in-place" in the decoder buffer block, where decoding comprises the step of recovering all the input symbols in the block, and reordering the input symbols according to their positions in the block. In-place implies the block does not require any additional memory to store the input symbols that are recovered. For example, an input symbol could be stored in the position of the output symbol that recovered it. Additionally, the output symbols may be sorted, or loaded into a decoder buffer block, such that if an input symbol is stored in the position of the recovering output symbol, then the recovered block of input symbols will be already sorted according to input symbol positions. Alternatively, the input symbols may be recovered, and then sorted in the decoder buffer block, or output to the input file reassembler 280 in the correct order.

If the block decoder 270 comprises two or more decoder buffer blocks, then the block decoder 270 can use pipelining to improve the efficiency of the decoding process. For example, the block decoder 270 can read the next block or blocks to be decoded from the decoder temporary storage buffer 255 while the current block is being decoded in-place.

Figure 11A:
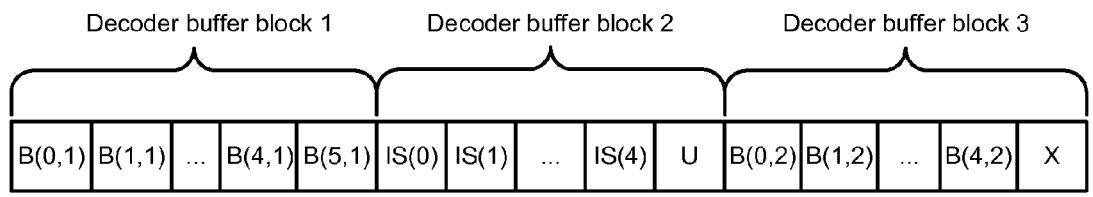
FIGS. 11a and 11b are illustrations of how memory access for a block decoder may be pipelined.

FIG. 11 shows two illustrations of how the block decoder 270 may use pipelining to improve the efficiency of the decoding process, and will be described with reference to FIG. 3. FIG. 11*a* shows a decoder buffer block comprising enough memory to store three blocks comprising six output symbols in each. An X in a position indicates that an output symbol from a block has not yet been read into the decoder buffer block, and a U in a position indicates that a position in the decoder buffer block is unused. In this embodiment, the block decoder 270 is decoding a block in-place in decoder buffer block 1; a second block in decoder buffer block 2 has already been decoded and is being output to the input file reassembler 280; and a third block is being loaded for decoding into decoder buffer block 3 in parallel. In one embodiment, block decoder 270 alternates in loading, decoding and outputting blocks among the set of decoder buffer blocks in a round robin manner. Where blocks vary in length and/or size, it may be more efficient to have more than three decoder buffer blocks, so that there is always a new block loaded into a decoder buffer block to be decoded by the block decoder 270. For example, a larger number of decoder buffer blocks may allow for greater variations in the loading, decoding, or outputting time of the block decoder 270 for the different blocks, without periods of waiting for the next block to be loaded into decoder buffer block.

Figure 11B:
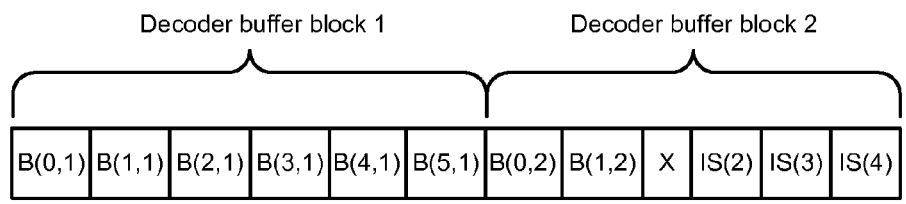

FIG. 11b shows a decoder buffer block comprising enough memory to store two blocks comprising six input symbols in each. In this embodiment, the block decoder 270 is decoding a block in-place in decoder buffer block 1; outputting a second block to the input file reassembler 280 in the second half of decoder buffer block 2; and loading a third block into the first half of decoder buffer block 2 (once the input symbols from the previously decoded block have been output) in parallel. In order to maximize the number of output symbols that can be loaded into decoder block buffer 2, the input symbols that are recovered, but have not been output yet, may be stored towards the end of the decoder block buffer if the block length is less than the decoder block buffer length. In one embodiment, the blocks of a file are ordered and loaded into the decoder buffer blocks for decoding in order.

In another embodiment, only the output symbols that actually recover input symbols are loaded into the decoder buffer block, as the remaining output symbols may not be required to decode the block. In this embodiment, the decoder buffer block may be the same length as the encoder buffer block.

The blocks within a file may be scheduled to be recovered starting with the first block of the file and ending with the last block of the file. Alternatively, the order in which the blocks are scheduled to be recovered may depend on an order in which the blocks of the file will be used by an application. For example, an application using the recovered blocks may first access the first block of the file, then the fifth block, then the second block, then the third block, then the fourth block. If this order of access is known either before or while the recovery process is occurring, then the blocks can be scheduled for recovery according to the order needed by the application.

Partitioning a File into Blocks

Consider a set of N files. The file j is defined to be of length $S(j)$ MB and is to be served at an aggregate rate of $R(j)$ Mbps for j=0, 1, ..., N−1. File j is partitioned into k(j) blocks, F(j,0), F(j,1), ..., F(j,k(j)−1). Define the length vector $S=(S(0), S(1), ..., S(N−1))$ and rate vector $R=(R(0), R(1), ..., R(N−1))$ for the set of files, and define $|S|=S(0)+S(1)+...+S(N−1)$ to be the aggregate file length, and $|R|=R(0)+R(1)+...+R(N−1)$ to be the aggregate file rate.

In one embodiment, there are system constraints for partitioning a file into blocks. For example, some processors perform operations on a particular word length, so it is more efficient for input symbols and output symbols to be an integer number of word lengths. For instance, the Intel Pentium III processor uses 4 byte registers, so there may be a constraint of a lower limit on the symbol length Mmin, where Mmin is equal to a multiple of 4 bytes. As another example, in some implementations of chain reaction coding, the amount of overhead (for example, the number of extra output symbols that the client should collect greater than the block size in order to decode) is proportionately smaller for larger block sizes. To minimize the required overhead, the blocks should be as large as possible in size. Therefore, there may be a minimum number of required symbols Kmin in a block.

Another possible constraint is the memory requirement for the block encoder 215 and block decoder 270. In some embodiments of chain reaction codes, the block encoder 215 and block decoder 270 perform more efficiently if the entire block is in a fast access memory for encoding and decoding respectively. Therefore, there may be a maximum block length, based on, for example, minimum and/or a maximum fast access memory requirements for the encoder and decoder. The maximum block length is defined to be Mmax·Kmax, where Mmax is a constraint on the maximum symbol length and Kmax is the maximum number of symbols in a block. The maximum symbol length and block size may be chosen based on fast access memory and overhead requirements. In one embodiment Mmin=Mmax, i.e., the input symbol length is the same for every file.

Figure 12:
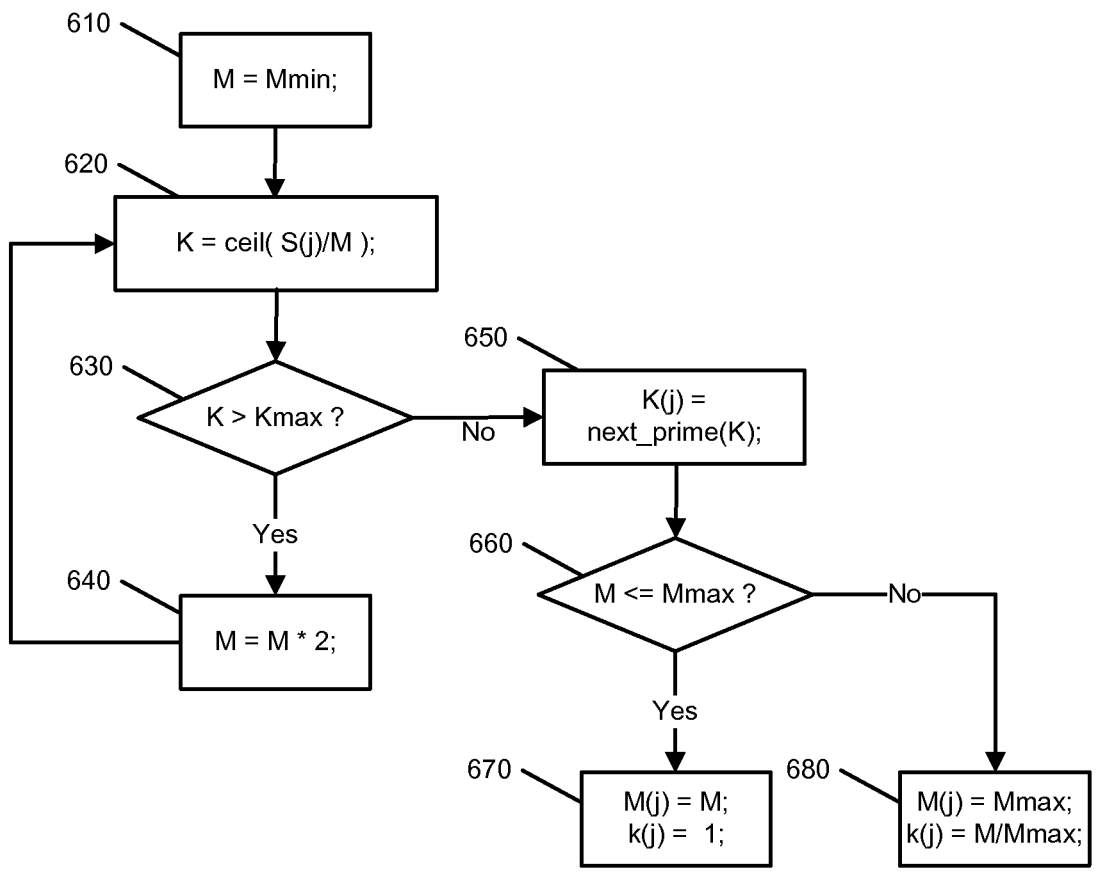
FIG. 12 is a simplified flow diagram of a process that may be used to partition a file into blocks.

FIG. 12 is a simplified flow diagram of a method, according to an embodiment of the invention, that may be implemented by a file block scheduler 220, on a file j of length $S(j)$ to determine the symbol length $M(j)$ and to partition the file into k(j) equal-sized blocks, where the number of blocks k(j) is a power of 2. This diagram is merely for illustrative purposes and is not intended to limit the scope of the claims herein. One skilled in the art will recognize many modifications, variations, and alternatives.

First, in a step 610, a symbol length is set to be Mmin, the minimum symbol length specified. Next, in a step 620, a number K of input symbols in the file, if the file were to be broken into symbols of length M bytes, is determined. In one embodiment, the last input symbol in the file is padded with zeros such that $S(j)/M$ is an integer, i.e., the file j comprises an integer number of input symbols of length M bytes.

In a step 630, K is checked to see if K>Kmax, i.e., if a file j with symbols of length M bytes will require more than a maximum number of input symbols in order to be of length $S(j)$. If yes, then in a step 640, the symbol length is increased by multiplying M by 2, and the flow returns to step 620. In one embodiment, Mmin is a power of 2 and the symbol lengths are all powers of 2. In another embodiment, $M=\alpha \cdot M+0$ in step 640, where $\alpha$ and $\beta$ are constants. If no in step 630, then in a step 650, the number of input symbols in block K(j)=next_prime(K), where the function next_prime(x) finds the smallest prime number greater than or equal to x. In another embodiment, K(j)=K, i.e., the block size is not required to be prime. In yet another embodiment, K(j) may be required to be the smallest power of P greater than or equal to K, where P is a prime. For example, the block size may be required to be a power of 2. It may also be checked if the file is of a minimum size K≧Kmin. For example, if M=Mmin, then it may be checked if the file is greater than or equal to a minimum block length, i.e., $S(j) \geq$ Mmin·Kmin.

Next in a step 660, it is determined whether the symbol length is less than or equal to the maximum symbol length specified. If yes, then the file length $S(j)$ is less than or equal to the maximum block length of Kmax·Mmax. In a step 670, the file j is partitioned into a single block, i.e., k(j)=1, with a symbol length of M(j)=M. If no, then the file length $S(j)$ is greater than the maximum block length, so the file should be partitioned into two or more blocks. In a step 680, the file j is partitioned into k(j)=M/Mmax blocks, with a symbol length of M(j)=Mmax, i.e., the file is divided into as few blocks as possible for a block size of K(j). In another embodiment, the file j is partitioned into k(j)=M/γ blocks and the symbol length M(j)=γ, where γ is an integer that divides M and Mmax≧γ≧Mmin. In still another embodiment, the number of blocks and the symbol length for each block are chosen so that the sum of the symbol lengths of all k(j) blocks is equal to M, where the symbol length M(j, i) of block i in file j is chosen such that Mmax≧M(j, i)≧Mmin.

For example, consider a file j of length S(j)=2 MB=2,097, 152 bytes. If Mmax=64 bytes, Mmin=4 bytes and Kmax=131,071, then the file j will be divided into k(j)=1 block, with a symbol length M(j)=32 bytes, and K(j)= next_prime(65,536)=65,537 input symbols. In this example, any file j of length S(j)≦8,388,544 bytes≈8 MB will comprise one block, and any file j of length S(j)>8,388,544 bytes will comprise at least two blocks, and have a symbol length M(j)=64 bytes.

As another example, consider a file j of length S(j)=20,973, 568 bytes≈20 MB. If Mmax=64 bytes, Mmin=4 bytes and Kmax=131,071, then the file j is divided into k(j)=4 blocks, with a symbol length M(j)=64 bytes, and K(j)=next_prime (81,928)=81,929 input symbols per block.

If K(j) is chosen to be the smallest prime number greater than or equal to K, then the file length is equal to S(j)=K·M, while the file is partitioned into blocks of K(j) input symbols. In order to partition file j into blocks of size K(j), k(j)·(K(j)− K) logical input symbols of value zero should be appended to the file j. In one embodiment, k(j)·(K(j)−K) logical input symbols of value zero are appended to the end of the file, and then the file is partitioned into equal size blocks. In another embodiment, the file is partitioned into k(j) blocks of size K, and K(j)−K logical input symbols of value zero are appended to the end of each block.

From the example above, the file j of length S(j)=20,973, 568 bytes requires K(j)=81,929 input symbols per block, so 4 logical input symbols of value zero should be appended to the file j. FIG. 13a is an illustration of how 4 logical input symbols of value zero may be appended to the end of the file. Each of the first 3 blocks comprises input symbols, while the last block comprises input symbols plus the 4 logical input symbols of value zero. FIG. 13b is an illustration of how 1 logical input symbol of value zero may be appended to the end of each of the 4 blocks of the file.

In another embodiment, the logical input symbols appended to the file can take an arbitrary value in the input symbol alphabet. In this embodiment, in order to generate a consistent set of output symbols for a client, every server that is generating output symbols for a block should append the same logical input symbols to the block.

In yet another embodiment, additional information about the block, or the file, may also be appended to a block. For example, a hash function computed on the input symbols of the block may be appended to each block before it is encoded, so that the block decoder 270 recovers the set of input symbols and the hash. The hash may be recomputed on the set of recovered input symbols, and checked if it is consistent with the recovered hash.

Methods for Scheduling Files

The file block scheduler 220, shown in FIG. 3, determines the order and frequency that a block is processed by the block encoder 215. The file block scheduler 220 should ensure that each file is served at the appropriate.

Given a set of files, the file block scheduler 220 generates a schedule of blocks for processing by the block encoder 215. In one embodiment, the file block scheduler 220 maintains a queue of the block indices of the blocks scheduled for encoding by the block encoder 215. When the block encoder 215 finishes generating output symbols for a block the file block scheduler 220 feeds the block encoder 215 the block index of the block at the head of the queue.

The block encoder 215 generates a row length of output symbols for a block each time it is processed, where a row length is the number of output symbols the block encoder 215 generates for a block multiplied by the output symbol length. The row length is usually the same (but need not be) for all blocks within a file, but may vary from file to file.

In one embodiment, the file block scheduler 220 schedules blocks in a set of files by allotting an amount of time for blocks in the file to be processed by the block encoder 215. For example, a time allotted to each file by the file block scheduler 220 may be a time for reading a block from the input symbol buffer 400 to the fast buffer 405. As another example, a time allotted to each file by the file block scheduler 220 may be a time for generating a fixed aggregate length of output symbols for a file. In one embodiment, the amount of time allotted to a file may be equal for all files. In another embodiment, the amount of time allotted to a file may be a function of the length of the file, the rate of the file, and/or other values as well. One skilled in the art will recognize many other combinations, variations, and alternatives to the above embodiments and examples.

In one embodiment, the file block scheduler 220 divides time into c time slots. If the block length is roughly the same for all files, then in one embodiment, the time slots are all of equal length. For example, the time slot duration may be the time to read a block of a specified length from the input symbol buffer 400 to the fast buffer 405. As another example, the time slot duration may be the time to generate a fixed aggregate length of output symbols. The file block scheduler 220 allocates c(j) time slots to file j and schedules a block from file j to be processed c(j) out of every c time slots. Define G(R(j), S(j)) to be a function of the length and the rate of the file j. In other variations, the function G may be dependent on other file or system parameters as well. For example, the function G may be dependent on the file index j, i.e., the function G may vary from file to file.

Although the disclosure below can be described for general parameters, for clarity of explanation consider the special case where the time slots are all of equal duration. It should be understood, however, that time slots need not be of equal duration. In some embodiments, time slots may have different durations. One skilled in the art will recognize many other combinations, variations, and alternatives.

In one embodiment, the number of time slots allocated to a file j is proportional to G(R(j), S(j)), i.e., the amount of time each file is processed is proportional to G(R(j), S(j)). For example, if G(R(j), S(j))=S(j)·R(j), then the number of time slots allocated to file j is proportional to the product of the rate R(j) and the length S(j) of file j, and so the amount of time spent processing file j will be proportional to the product of the length and the rate of file j. Over a period of T seconds, file j is processed for approximately $$T \cdot \frac{G(R(j), S(j))}{\left( \sum_{i=0}^{N-1} G(R(i), S(i)) \right)} \text{ seconds,} \qquad \text{(Equ. 1)}$$

for j=0, 1, . . . , N−1, where N is the number of files to be scheduled.

Figure 14:
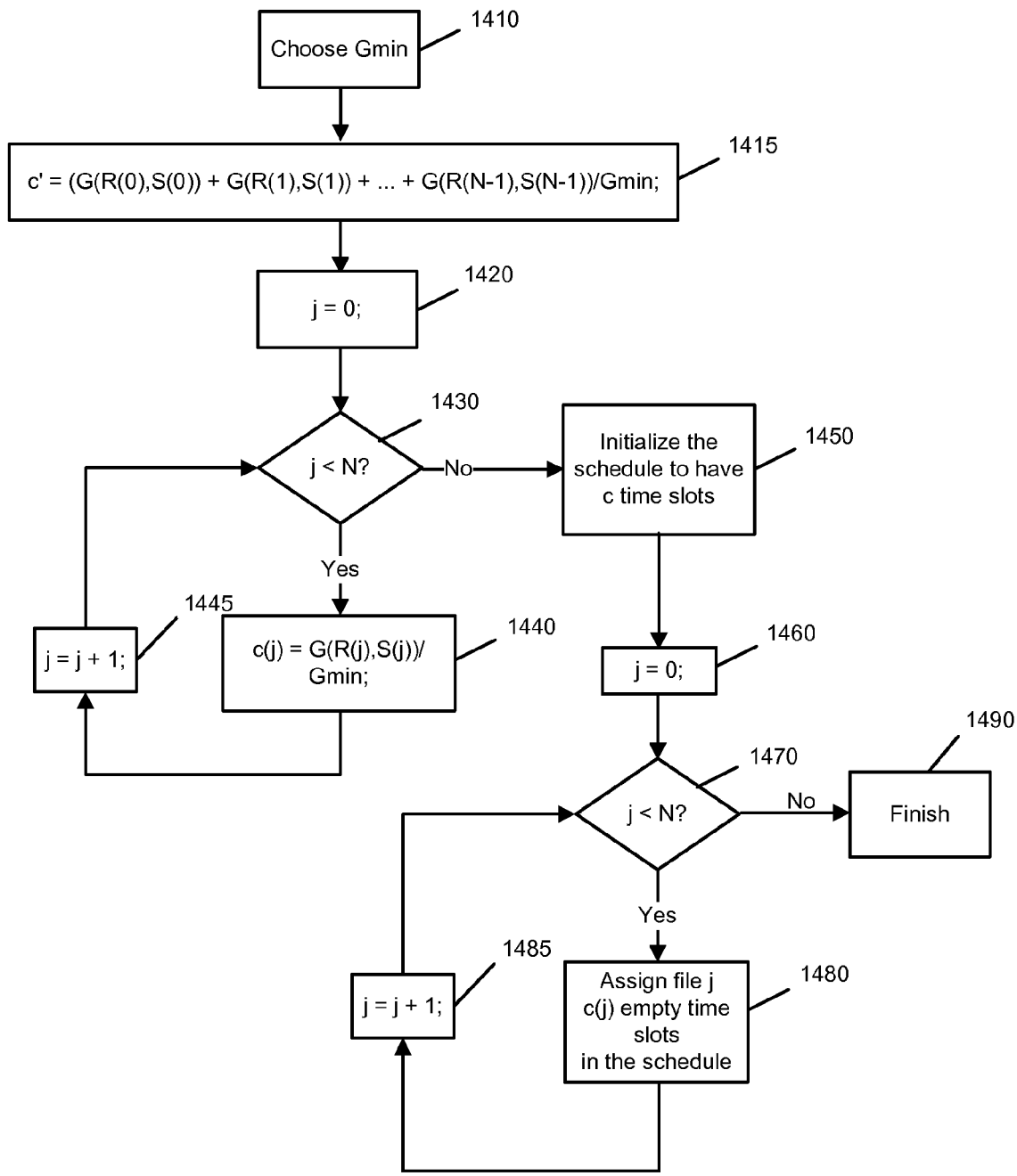
FIG. 14 is a simplified flow diagram of a process that may be used to schedule a set of files, where each file is scheduled according to a function of its rate and/or length.

FIG. 14 is a simplified flow diagram of a method, according to an embodiment of the invention, that may be implemented by a file block scheduler 220 to determine the number of time slots c(j) assigned to file j, and to assign c(j) of the c time slots in the schedule to file j, for j=0, 1, . . . , N−1. This diagram is merely for illustrative purposes and is not intended to limit the scope of the claims herein. One skilled in the art will recognize many modifications, variations, and alternatives.

First, in a step 1410, Gmin is chosen, where Gmin represents a minimum value for the function G(R(j), S(j)). Next in a step 1415, a number of time slots c' to be scheduled is determined, where $$c' = \sum_{i=0}^{N-1} G(R(i), S(i)) / G\text{min}.$$

In one embodiment, c' may have a maximum value c. For example, if there is a minimum row length, then a large value of c' may require a very large aggregate buffer space |B|. In this embodiment, the number of time slots c' is determined, such that $$c' = \min\left\{\sum_{i=0}^{N-1} G(R(i), S(i)) / G\text{min}, c\right\}, \quad \text{(Equ. 2)}$$

and may adjust the value of Gmin if necessary, where Gmin is now $$G\text{min} = \sum_{i=0}^{N-1} G(R(i), S(i)) / c'. \quad \text{(Equ. 3)}$$

Next, in a step 1420, j is initialized to 0, where j represents the index of the file to be assigned a number of time slots c(j). In a step 1430, it is checked if there are more files to be assigned a number of time slots. If yes, then in steps 1440 and 1445, c(j) is calculated and j is incremented by 1. If G(R(j), S(j)) is not a multiple of Gmin, then in one embodiment, c(j) may be rounded to the nearest integer. In another embodiment, c(j) is set to the smallest integer greater than or equal to G(R(j), S(j))/Gmin. In both cases, the value of c' may be adjusted accordingly. If no in step 1430, then all the files have been assigned a number of time slots, and in a step 1450, the schedule is initialized to contain c time slots. In one embodiment c=c(0)+c(1)+ . . . +c(N−1). In another embodiment, c>c(0)+c(1)+ . . . +c(N−1) so that a new file to be served may be allocated a number of time slots without effecting the scheduling of the files currently being served. The disk, processor and other system components may be used for other purposes during a time slot not assigned to process a file.

Next in a step 1460, j is initialized to 0, where j now represents the index of the file to be assigned c(j) time slots in the schedule. In a step 1470, it is checked if there are more files to be assigned time slots in the schedule. If yes, then in steps 1480 and 1485, file j is assigned c(j) of the remaining empty time slots in the schedule and j is incremented by 1. If no in step 1470, then in a step 1490, the flow finishes. In one embodiment, the files are processed in descending order of the number of time slots c(j) assigned to each file in steps 1470, 1480, and 1485.

In one embodiment, the c(j) time slots for file j are chosen to be spread as far apart as possible among the c time slots. For example, every c/c(j)-th time slot is assigned to file j, if possible. If a time slot is not available, then the nearest time slot before or after a preferred time slot may be chosen to assign to file j. In another embodiment, the c(j) time slots for file j are chosen to be contiguous, where file 0 is assigned the first c(0) time slots, file 1 is assigned the next c(1) time slots, etc.

In one embodiment, a fixed number of time slots c is used. A new file to be served is added by assigning time slots to the file if there are enough available. Similarly, a file can be removed by simply freeing its allocated time slots. In another embodiment, the number of time slots used may be varied according to the set of files being served. When the total number of time slots c changes, then the row length for each file may change as well. Adding and deleting files will be described below.

In another embodiment, time slots are not used to schedule blocks in the files. Instead, a file j is assigned a buffer length B(j), for j=0, 1, . . . , N−1, where the buffer length may be based on one or more of the length of file j, the rate of file j, the number of files currently being served, and a function of the length vector R, or the rate vector S. In this embodiment, a block is chosen to be scheduled based on how soon the buffer for that block will be emptied. By the appropriate choice of a row length, and hence the buffer length, each file may be processed for an amount of time that is proportional to G(R(j), S(j)).

In one embodiment, the set of files being served is stored on a plurality of disks. In this embodiment, the order that the blocks are processed may be varied based on which of the disks a block is stored. For example, reading a block may alternate from each of the plurality of disks. As another example, if the block encoder 215 (FIG. 3) can process two or more blocks in parallel, then the blocks may be scheduled such that a pair of blocks processed in parallel are stored on different disks as frequently as possible. In another embodiment, the disk on which to store a particular block in a file may be selected based on where the block appears on the schedule relative to other blocks already stored on the disk.

Assigning Time Slots to Blocks within a File

In each time slot assigned to a file, one or more blocks in the file may be processed by the block encoder 215. For example, in one embodiment, the block encoder 215 processes one block in each time slot. The file block scheduler 220 determines a schedule for processing the blocks for each file, and each file may have a different schedule. Note that all the blocks in file j are not required to be processed in c(j) time slots, and thus, the number c(j) of time slots may be smaller than the number of blocks in file j.

In one embodiment, the file block scheduler 220 determines a list of block indices in file j, where a block index may appear more than once in the list. The blocks for file j are processed in an order according to the list for file j whenever a time slot assigned to file j occurs in the schedule, for j=0, 1, . . . , N−1. During a time slot assigned to file j, blocks for file j are processed in an order according to the corresponding list. Processing in a current time slot for file j picks up where processing ended in the last time slot for file j, and when the last block in the list has been processed, processing begins again at the start of the list. In one embodiment, each block index appears exactly once in the list. For example, the list may comprise block indices in ascending order. In this embodiment, the blocks within file j are scheduled for processing in a round robin manner. In another embodiment, each block in a file is assigned a weight, and the number of times a block index appears in the list is proportional to the weight. For example, if the blocks in a file are served at different rates, then the weight assigned to a block may be proportional to the rate at which it is to be served. One skilled in the art will recognize many other combinations, variations, and alternatives to the above-described embodiments of scheduling blocks for processing.

Assigning a Buffer Length to a File

Although the disclosure below can be described for general parameters, for clarity of explanation consider the special case where the blocks in a file are processed in a round robin manner. It is to be understood, however, that blocks need not be processed in round robin manner.

A round time t(j, i) of block i in file j may be defined as the maximum time it takes from when the block encoder 215 (FIG. 3) starts to process block i of file j until when it starts to process block i of file j a next time. If the blocks are processed in a round robin manner, then the round time is roughly the same for all blocks within a file, i.e., $t(j,0)=t(j,1)=\ldots=t(j,k(j)-1)$. The round time may be referred to as t(j) for all blocks in file j in this case. For example, define the memory transfer speed $R_D$ Mbps, to be the rate at which a file is read from the input symbol buffer 400 into the fast buffer 405. If the memory transfer speed is the limiting factor in determining the rate at which the block encoder 215 can generate output symbols for a file, then the file j of length S(j) will take $(S(j)/R_D)$ seconds to be processed. In this embodiment, the file j will have a round time of $$t(j) = \frac{\sum_{i=0}^{N-1} G(R(i), S(i))}{G(R(j), S(j))} \cdot \frac{S(j)}{R_D} \text{ seconds.} \quad \text{(Equ. 4)}$$

The round time for different files may vary.

The minimum buffer length for file j is $B(j)=R(j) \cdot t(j)$ Mbits, for $j=0, 1, \ldots, N-1$, i.e., the minimum buffer length is equal to the aggregate length of output symbols transmitted for a file in single round time. If the server transmits output symbols at the same rate for each block in the file, then the file j has a minimum row length $b(j)=B(j)/k(j)=R(j) \cdot t(j)/k(j)$ Mbits for each block. $|B|=B(0)+B(1)+\ldots+B(N-1)$ may be defined as the minimum aggregate buffer length required for the set of files being served.

Several scheduling methods that can be used by the file block scheduler 220 to schedule blocks in each file for encoding by the block encoder 215 are described below. The primary difference between each method is the choice of the function G(R(j), S(j)).

Scheduling Each File for an Equal Amount of Time

Equal-time (ET) scheduling is a scheduling method that can be used by the file block scheduler 220 (FIG. 3) to schedule blocks in each file for processing by the block encoder 215 (FIG. 3). For ET scheduling, the function G(R(j), S(j))=Gmin, for $j=0, 1, \ldots, N-1$, i.e., the file block scheduler 220 allots the same number of slots, (or an equal amount of processing time) to each file, independent of the rate, or the length of the file. For example, if N files are served for a period of T seconds, then from (Equ. 1) each file is processed for approximately $$T \cdot \frac{G\min}{N \cdot G\min} = \frac{T}{N} \text{ seconds,} \quad \text{(Equ. 5)}$$

If the blocks in each file are processed in a round robin manner, and if the memory transfer speed is the limiting factor in determining the rate at which the block encoder 215 can generate output symbols for a file, then the file j will have a round time of $t(j)=N \cdot S(j)/R_D$ seconds, for $j=0, 1, \ldots, N-1$, i.e., the round time for file j is proportional to its length. For example, if file i is twice the length of file j, i.e., $S(i)=2 \cdot S(j)$, then file i will have a round time $t(i)=2 t(j)$. The file j requires a buffer of length $B(j)=R(j) \cdot t(j)=R(j) \cdot N \cdot S(j)/R_D$ MB, for $j=0, 1, \ldots, N-1$. The row length of file j is $B(j)/k(j)=R(j) \cdot N \cdot S(j))/(R_D \cdot k(j))$ MB, i.e., the row length is proportional to the rate of a file. The higher the rate of a file, the greater the aggregate length of output symbols to be generated when each block in the file is processed. For example, if the time slot duration is equal for all blocks, then the block encoder 215 may have to generate output symbols at different rates for different blocks. If the block length is roughly the same for all files, then the row length is approximately the same for two files having the same rate but of different lengths. The ratio $B(j)/B(i)=(R(j) \cdot S(j))/(R(i) \cdot S(i))$. So, for example, a file j of twice the length and half the rate of file i, will have the same buffer length as file i. The aggregate buffer length required by ET is $|B|=N \cdot \langle R, S \rangle / R_D$ MB where $\langle R, S \rangle = R(0) \cdot S(0)+R(1) \cdot S(1)+\ldots+R(N-1) \cdot S(N-1)$, i.e., the inner product of the vectors R and S.

One embodiment of an ET scheduling method will now be described with reference to FIGS. 5 and 14. Gmin is set to be the time slot duration. In this embodiment, $c(j)=1$, for $j=0, 1, \ldots, N-1$, i.e., one time slot is allocated out of every c time slots to each file according to an ordering of the files. For example, Gmin may be chosen to be the time to read a block of a specified length from the input symbol buffer 400 to the fast buffer 405. If the block length is roughly the same for all files, then for example, a block from a file may be processed in each time slot. In this case, when a block from file j is processed, one block from every other file is processed before a block from file j is processed again.

Figure 16A:
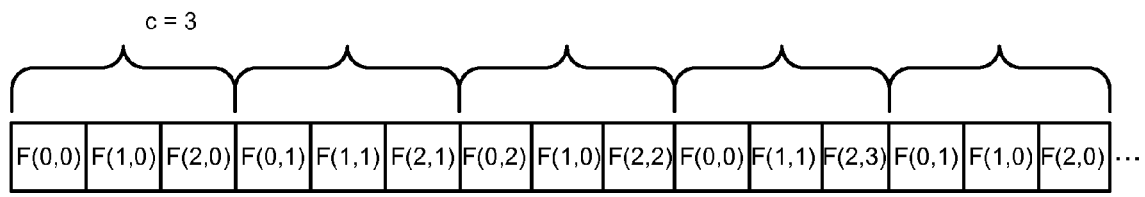
FIGS. 16a and 16b are illustrations of how an equal-time scheduler may schedule and allocate a buffer length to serve the files in FIG. 15 at their corresponding rates.

For example, consider a set of N=3 files with length vector $S=(S(0), S(1), S(2))=(3, 2, 4)$ MB and rate vector $R=(R(0), R(1), R(2))=(1, 1, 2)$ Mbps. FIG. 15 shows the relative lengths of the three files, where each file is broken into blocks of length 1 MB, i.e., $k(0)=3$, $k(1)=2$, and $k(2)=4$. Let the memory transfer speed $R_D=24$ Mbps. Let one block be processed in each time slot, so the time slot duration is the time required to read a block of 1 MB, which is 1/3 second. The number of time slots assigned to each file are $c(0)=c(1)=c(2)=1$. FIG. 16a is an illustration of a method according to an embodiment of the invention that may be implemented by a file block scheduler 220 (FIG. 3), using an ET scheduling method, to schedule a set of files being served so that each file is served at its corresponding rate. The illustration is merely an example of an ET scheduling method and is not intended to limit the scope of the claims herein. One skilled in the art will recognize many modifications, variations, and alternatives.

Figure 16B:
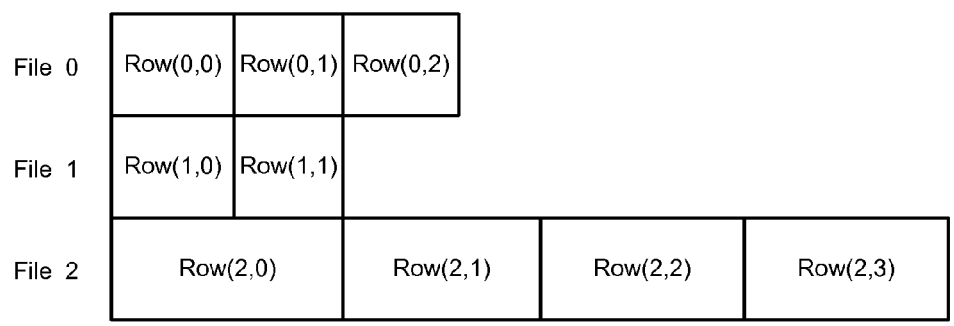

FIG. 16a shows how the first 15 time slots for c=3 may be scheduled using an ET scheduling method. The files are scheduled according to the file index, where a block from each file is processed every third time slot. The round times are $t(0)=3 \cdot 3/(24/8)=3$ seconds, $t(1)=3 \cdot 2/(24/8)=2$ seconds, and $t(2)=3 \cdot 4/(24/8)=4$ seconds, where the time slot duration is 1/3 of a second. FIG. 16b shows the buffer length allocated to each file partitioned into rows for each block. The buffer lengths are $B(0)=1/8 \cdot 3=3/8$ MB, $B(1)=1/8 \cdot 2=1/4$ MB, and $B(2)=2/8 \cdot 4=1$ MB.

Scheduling Each File According to the Length of the File

Length-dependent (LD) scheduling is another scheduling method that can be used by the file block scheduler 220 (FIG. 3) to schedule blocks in each file for processing by the block encoder 215 (FIG. 3). For LD scheduling, the function $G(R(j), S(j))=S(j)$, for $j=0, 1, \ldots, N-1$, i.e., the number of time slots allotted, or the amount of processing time for each file is proportional to the length of the file and independent of the rate of the file. For example, if the aggregate file length is $|S|$, then from (Equ. 1) over a period of T seconds, file j is processed for approximately $$T \cdot \frac{S(j)}{\left(\sum_{i=0}^{N-1} S(i)\right)} = T \cdot \frac{S(j)}{|S|} \text{ seconds,} \quad \text{(Equ. 6)}$$

for j=0, 1, . . . , N−1.

If the blocks in each file are processed in a round robin manner, and if the memory transfer speed is the limiting factor in determining the rate at which the block encoder 215 can generate output symbols for a file, then the file j will have a round time of $t(j)=(|S|/S(j))\cdot(S(j)/R_D)=|S|/R_D$ seconds, for j=0, 1, . . . , N−1, i.e., the round time is independent of the rate or the length of a file and is equal to the amount of time to load all the files from the input symbol buffer 400 to the fast buffer 405. The file j requires a buffer of length $B(j)=R(j)\cdot t(j)=R(j)\cdot|S|/R_D$ MB, for j=0, 1, . . . , N−1. The row length of file j is $B(j)/k(j)=(R(j)\cdot|S|)/(R_D\cdot k(j))$ MB, i.e., the row length is proportional to the rate of a file divided by the number of blocks in the file. For a fixed block length, the number of blocks is proportional to the length of the file, so the row length will be inversely proportional to the length of the file. Therefore, the higher the rate of a file, or the smaller the file, the greater the aggregate length of output symbols to be generated when each block in the file is processed. If the block length is roughly the same for all files, then the ratio of the row lengths for two files of different lengths that are being served at the same rate is inversely proportional to the ratio of the lengths of the files. In general, for a fixed block length, the row length is a function of both the rate and the length of a file. The ratio B(j)/B(i)=R(j)/R(i), which is independent of the file lengths. The aggregate buffer length required by LD is $|B|=|R|\cdot|S|/R_D$ MB.

One embodiment of an LD scheduling method will now be described with reference to FIG. 14. Gmin is set to be a minimum length Smin. In one embodiment, Smin is the lowest common multiple of the lengths of all the files being served. In another embodiment, Smin is the minimum block length for a file. In step 1440, c(j)=S(j)/Smin, for j=0, 1, . . . , N−1, i.e., the number of slots allocated is proportional to the length of the file. If the block length is roughly the same for all files and is chosen to be equal to Smin, then c(j)=k(j). In this embodiment, a block may be scheduled from a file to be processed in each time slot, so that each file can be processed completely every c time slots. For example, the files may be ordered such that each file appears exactly once in the order, and allocated time slots, such that each file is assigned c(j) adjacent time slots according to the order. Since each file can be processed once completely in c time slots, the amount of time spent processing a file will be proportional to the length of the file.

For example, consider again the set of N=3 files in FIG. 15 with length vector S=(S(0), S(1), S(2))=(3, 2, 4) MB, rate vector R=(R(0), R(1), R(2))=(1, 1, 2) Mbps, where each file is broken into blocks of length 1 MB, and the memory transfer speed $R_D$=24 Mbps. Let one block be processed in each time slot, so the time slot duration is the time required to read a block of 1 MB, which is 1/3 second. If Smin is chosen as 1 MB, then c'=(3+2+4)/1=9. The number of time slots assigned to each file are c(0)=3, c(1)=2, and c(2)=4.

Figures 17A, 17B:
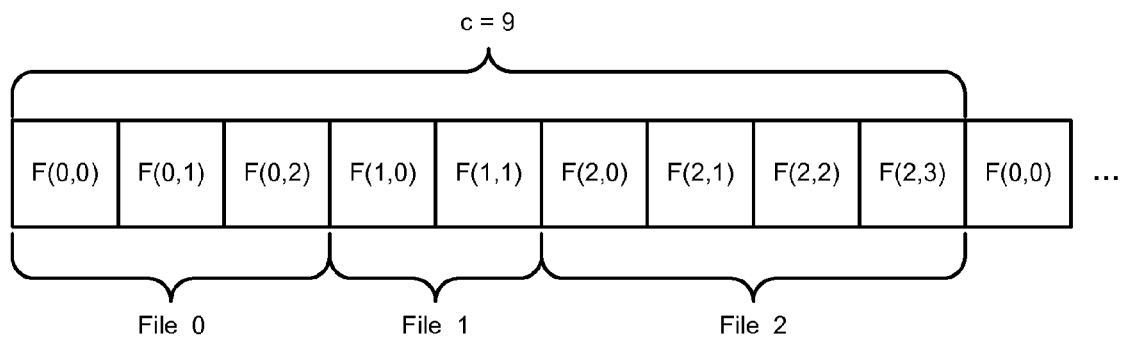
FIGS. 17a and 17b are illustrations of how a length-dependent scheduler may schedule and allocate a buffer length to serve the files in FIG. 15 at their corresponding rates.

FIG. 17a is an illustration of a method, according to an embodiment of the invention that may be implemented by a file block scheduler 220 (FIG. 3), using an LD scheduling method, to schedule a set of files being served so that each file is served at its corresponding rate. The illustration is merely an example of a LD scheduler and is not intended to limit the scope of the claims herein. One skilled in the art will recognize many modifications, variations, and alternatives.

FIG. 17a shows how the first 10 blocks for the three files may be scheduled where c=9. The files are ordered according to the file index, where a file is processed completely before a next file is scheduled. The round times are t(0)=t(1)=t(2)=(2+3+4)/(24/8)=3 seconds. FIG. 17b shows the buffer length allocated to each file partitioned into rows for each block. The buffer lengths are B(0)=1/8·3=3/8 MB, B(1)=1/8·3=3/8 MB, and B(2)=2/8·4=3/4 MB. The buffer length for a file is independent of the file length. For example, files 0 and 1 are of different lengths, but are served at the same rate, so B(0)=B(1). However, the row lengths for files 0 and 1 are not the same, so the aggregate length of output symbols generated by the block encoder 215 (FIG. 3) for a block in file 0 or 1 in a time slot is not the same.

Scheduling Each File According to the Rate of the File

Rate-dependent (RD) scheduling is another scheduling method that can be used by the file block scheduler 220 (FIG. 3) to schedule blocks in each file for processing by the block encoder 215 (FIG. 3). For RD scheduling, the function G(R(j), S(j))=R(j), for j=0, 1, . . . , N−1, i.e., the number of time slots allotted, or the amount of processing time for each file is proportional to the rate of the file and independent of the length of the file. For example, if the aggregate rate is |R|, then from (Equ. 1) over a period of T seconds, file j is processed for approximately $$T \cdot \frac{R(j)}{\left(\sum_{i=0}^{N-1} R(i)\right)} = T \cdot \frac{R(j)}{|R|} \text{ seconds,} \quad \text{(Equ. 7)}$$

for j=0, 1, . . . , N−1.

If the blocks in each file are processed in a round robin manner, and if the memory transfer speed is the limiting factor in determining the rate at which the block encoder 215 can generate output symbols for a file, then the file j will have a round time of $t(j)=(|R|/R(j))\cdot(S(j)/R_D)$ seconds, for j=0, 1, . . . , N−1, i.e., the round time is proportional to the length and inversely proportional to the rate of the file. For example, a file served at twice the rate of a second file of the same length will have half the round time of the second file. The file j requires a buffer of length $B(j)=R(j)\cdot t(j)=S(j)\cdot|R|/R_D$ MB, for j=0, 1, . . . , N−1. The row length of file j is $B(j)/k(j)=(S(j)\cdot|R|)/(R_D\cdot k(j))$ MB, i.e., the row length is proportional to the length divided by the number of blocks. If the block length is roughly the same for all files, then the row length is roughly the same for every file being served independent of the rate, or the length of a file, i.e., the aggregate length of output symbols generated by the block encoder 215 is roughly the same for each block that is processed. Referring now to FIGS. 3-5, the block encoder 215 therefore generates output symbols at roughly a constant rate, if blocks are loaded from the input symbol buffer 400 to the fast buffer 405 at roughly a constant rate. The ratio B(j)/B(i)=S(j)/S(i), which is independent of the rates of the files. The aggregate buffer length required by RD scheduling is $|B|=|R|\cdot|S|/R_D$ MB, which is the same as the aggregate buffer length required by the above described embodiment of the LD scheduling method. The aggregate buffer length is independent of the number of files, and is a function of the aggregate rate and aggregate length of the set of files being served.

For example, consider a set of N=5 files with length vector S=(1, 2, 3, 4, 5) MB, rate vector R=(1, 2, 3, 4, 5) Mbps and a memory transfer speed $R_D$=1 Mbps. The aggregate buffer length required by an RD and an LD scheduling method is |B|=(1+2+3+4+5)·(1+2+3+4+5)/1=225 MB. As another example, if the rate vector R=(5, 4, 3, 2, 1) Mbps, then the aggregate buffer length required by RD and LD scheduling is |B|=(1+2+3+4+5)·(5+4+3+2+1)/1=225 MB, which is the same, since the aggregate rate |R| is the same.

One embodiment of an RD scheduling method will now be described with reference to FIG. 14. Gmin is set to be a minimum rate Rmin. In one embodiment, Rmin is the lowest common multiple of the rates of all the files being served. In another embodiment, Rmin is the minimum rate to serve a file. In a step 1440, c(j)=R(j)/Rmin, for j=0, 1, . . . , N−1, i.e., the number of slots allocated is proportional to the rate of the file. If the block length is roughly the same for all files, then in one embodiment, c(j) time slots are allocated to file j and a block from file j is scheduled to be read into fast access memory on average c(j) out of every c time slots. The number of time slots allocated to file j is proportional to the rate R(j), so the amount of time spent processing a file will be proportional to the rate of a file.

For example, consider again the set of N=3 files in FIG. 15 with length vector S=(S(0), S(1), S(2))=(3, 2, 4) MB, rate vector R=(R(0), R(1), R(2))=(1, 1, 2) Mbps, where each file is broken into blocks of length 1 MB, and the memory transfer speed $R_D$=24 Mbps. Let one block be processed in each time slot, so the time slot duration is the time required to read a block of 1 MB, which is 1/3 second. If Rmin is chosen to be 1 Mbps, then c'=(1+1+2)/1=4. The number of time slots assigned to each file are c(0)=c(1)=1 and c(2)=2.

Figures 18A, 18B:
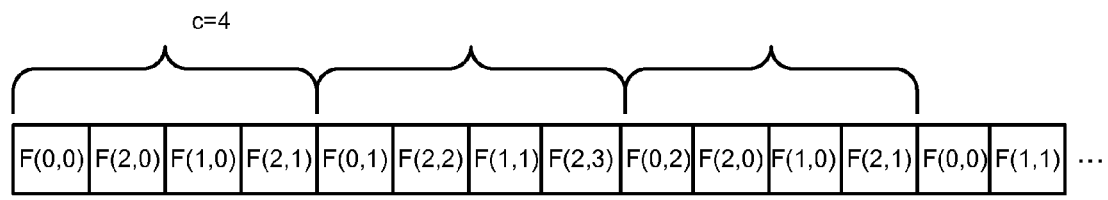
FIGS. 18a and 18b are illustrations of how a rate-dependent scheduler may schedule and allocate a buffer length to serve the files in FIG. 15 at their corresponding rates.

FIG. 18a is an illustration of a method, according to an embodiment of the invention that may be implemented by a file block scheduler 220 (FIG. 3), using an RD scheduling method, to schedule a set of files being served so that each file is served at its corresponding rate. The illustration is merely an example of a RD scheduler and is not intended to limit the scope of the claims herein. One skilled in the art will recognize many modifications, variations, and alternatives.

FIG. 18a shows an example of how an RD scheduling method may schedule the first 14 blocks for the three files, where c=4. File 2 is scheduled every second time slot, and files 0 and 1 are each scheduled every fourth time slot. The round times are t(0)=(4/1)·3/(24/8)=4 seconds, t(1)=(4/1)·2/(24/8)=8/3 seconds, and t(2)=(4/2)·4/(24/8)=8/3 seconds. FIG. 18b shows the buffer length allocated to each file partitioned into rows for each block. The buffer lengths are B(0)=1/8·4=1/2 MB, B(1)=1/8·8/3=1/3 MB, and B(2)=2/8·8/3=2/3 MB. The buffer length for a file is independent of the rate, and the row length for each block is proportional to the length of the block. In this example, the files are different lengths and are served at different rates but all the blocks have the same row length. Therefore, the aggregate length of output symbols generated for each block processed by the block encoder 215 (FIG. 3) is the same.

Scheduling Each File According to the Length and the Rate of the File

Length-rate-dependent (LRD) scheduling is another scheduling method that can be used by the file block scheduler 220 (FIG. 3) to schedule blocks in each file for processing by the block encoder 215 (FIG. 3). For LRD scheduling, the function G(R(j), S(j))=S(j)·R(j), for j=0, 1, . . . , N−1, i.e., the number of time slots allotted, or the amount of processing time for each file is proportional to the product of length and the rate of the file. For example, if the aggregate rate is |R|, then from (Equ. 1) over a period of T seconds, file j is processed for approximately $$T \cdot \frac{S(j) \cdot R(j)}{\left(\sum_{i=0}^{N-1} S(i) \cdot R(i)\right)} = T \cdot \frac{S(j) \cdot R(j)}{\langle R, S \rangle} \text{ seconds,} \quad \text{(Equ. 8)}$$

for j=0, 1, . . . , N−1.

If the blocks in each file are processed in a round robin manner, and if the memory transfer speed is the limiting factor in determining the rate at which the block encoder 215 can generate output symbols for a file, then the file j will have a round time of t(j)=(⟨R, S⟩/(R(j)·S(j)))·(S(j)/$R_D$)=⟨R, S⟩/(R(j)·$R_D$) seconds, for j=0, 1, . . . , N−1, i.e., the round time is inversely proportional to the rate and independent of the length of a file. For example, a file served at twice the rate of a second file will have half the round time of the second file independent of the relative lengths of the two files. The file j requires a buffer of length B(j)=R(j)·t(j)=R(j)·⟨R, S⟩/(R(j)·$R_D$)=⟨R, S⟩/$R_D$ MB, for j=0, 1, . . . , N−1. The row length of file j is B(j)/k(j)=⟨R, S⟩/($R_D$·k(j)) MB, i.e., the row length is inversely proportional to the number of blocks and independent of the rate of a file. If the block length is roughly the same for all files, then the row length is inversely proportional to the length of the file and independent of the rate. The ratio B(j)/B(i)=1, i.e., the buffer length is the same for every file. The aggregate buffer length required by LRD scheduling is |B|=N·⟨R, S⟩/$R_D$ MB, which is the same as the aggregate buffer length required above by an embodiment of an ET scheduling method. The aggregate buffer length is dependent on the inner product of the rates and lengths of each file, as well as the number of files being served.

For example, consider a set of N=5 files with length vector S=(1, 2, 3, 4, 5) MB, rate vector R=(1, 2, 3, 4, 5) Mbps and a memory transfer speed $R_D$=1 Mbps. The aggregate buffer length required by LRD and ET is |B|=(1·1+2·2+3·3+4·4+5·5)·5/1=275 MB which is 50 MB more than the aggregate buffer length required by an embodiment of an RD and LD scheduler. As another example, if the rate vector R=(5, 4, 3, 2, 1), then the aggregate buffer length required by LRD and ET scheduling is |B|=(5·1+4·2+3·3+2·4+1·5)·5/1=175 MB which is 50 MB less than the aggregate buffer length required by an embodiment of an RD or LD scheduling method.

One embodiment of an LRD scheduling method will now be described with reference to FIG. 14. Gmin is set to be a product of a minimum rate Rmin and a minimum length Smin, i.e., Gmin=Smin·Rmin. In a step 1440, c(j)=(S(j)·R(j))/(Smin·Rmin), for j=0, 1, . . . , N−1, i.e., the number of slots allocated is proportional to the product of the length and the rate of the file. If the block length is roughly the same for all files, then in one embodiment, c(j) time slots are allocated to file j and a block from file j is scheduled to be read into fast access memory on average c(j) out of every c time slots. The number of time slots allocated to file j is proportional to S(j)·R(j), so the amount of time spent processing a file will be proportional to the product of the length and the rate of a file.

For example, consider again the set of N=3 files in FIG. 15 with length vector S=(S(0), S(1), S(2))=(3, 2, 4) MB, rate vector R=(R(0), R(1), R(2))=(1, 1, 2) Mbps, where each file is broken into blocks of length 1 MB, and the memory transfer speed $R_D$=24 Mbps. Let one block be processed in each time slot, so the time slot duration is the time required to read a block of 1 MB, which is 1/3 second. If Smin is chosen to be 1 MB and Rmin=1 Mbps, then c'=(3·1+2·1+4·2)/1=13. The number of time slots assigned to each file are c(0)=3, c(1)=2 and c(2)=8.

Figures 19A, 19B:
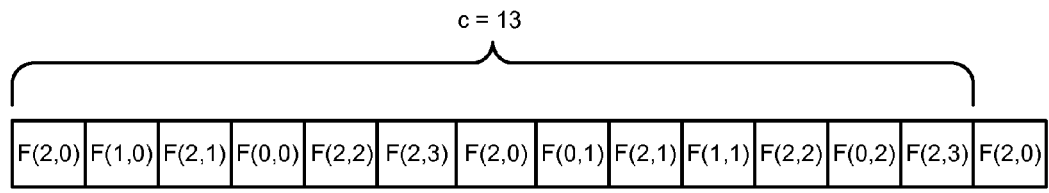
FIGS. 19a and 19b are illustrations of how a length-rate-dependent scheduler may schedule and allocate a buffer length to serve the files in FIG. 15 at their corresponding rates.

FIG. 19a is an illustration of a method according to an embodiment of the invention that may be implemented by a file block scheduler 220 (FIG. 3), using a LRD scheduling method to schedule a set of files being served so that each file is served at its corresponding rate. The illustration is merely an example of an LRD scheduling method and is not intended to limit the scope of the claims herein. One skilled in the art will recognize many modifications, variations, and alternatives.

FIG. 19a shows an example of how the first 14 blocks for the three files may be scheduled, where c=13. The round times are t(0)=13/(1.24/8)=13/3 seconds, t(1)=13/(1.24/8)=13/3 seconds, and t(2)=13/(2.24/8)=13/6 seconds. FIG. 19b shows the buffer length allocated to each file is partitioned into rows for each block. The buffer lengths are B(0)=B(1)=B(2)=13/3 MB. The buffer length for a file is independent of the rate and the length.

If the rate of a file generally increases (or at least stays the same) as a file length increases, i.e., if clients downloading large files are more likely to have access to a greater download bandwidth, then RD and LD scheduling require a smaller aggregate buffer length for a given aggregate file length and rate as compared to ET and LRD scheduling. Another desirable property of RD and LD scheduling is that the aggregate buffer length is a function of the aggregate file length and rate, but is independent of the number of files being served.

Server Capacity

The server capacity C may be defined to be the maximum aggregate serving rate |R| that is achievable by the server for an aggregate file length |S|. The server may be said to be efficient if the capacity that is achievable for a single file is the same as the capacity achievable for an arbitrary number of files of the same aggregate length |S|. The length of memory, and the disk read/write, memory, cache and processor speeds are important factors in determining the server capacity.

Server capacity will be further described with reference to FIGS. 3-5. Consider a server operating on a single file F(0) of length S(0)=|S| Mbits, served at a rate R(0)=|R| bps (bits per second), with a memory transfer speed of $R_D$ Mbps, i.e., it takes $|S|/R_D$ seconds to load the file into the fast buffer 405. If the block encoder 215 can generate output symbols at an arbitrary rate for a block stored in fast buffer 405, then the round time for the file is determined by the memory transfer speed. Therefore, the round time t(0)=$|S|/R_D$ seconds, and the buffer length B(0), required for the file is B(0)=|B|=|R|·t(0)=|R|·$|S|/R_D$ Mbits. For a fixed maximum buffer length |B|, the server capacity C=$R_D$·|B|/|S| Mbps.

As another example, consider a server operating on a single file of length S(0)=|S| Mbits that is served at a rate R(0)=|R| Mbps, where the round time t(0) is now determined by a maximum encoding rate, i.e., the maximum rate that the encoder generates output symbols. Let the maximum encoding rate, which may be based on the memory, cache and processor speeds, be $R_S$ bps. In one embodiment, $R_S$ is dependent on the number of input symbols in each block of the file, and/or the length of each input symbol. If there is no limit on the length of the buffer |B|, then the server capacity is simply the maximum rate that the server generates output symbols, i.e., C=$R_S$ bps.

Combining the previous two examples, consider a server operating on a single file of length S(0)=|S| Mbits that is served at a rate R(0)=|R| Mbps, where the maximum rate at which the file can be served is limited by the aggregate buffer length |B|, the memory transfer speed $R_D$ Mbps, and the maximum encoding rate $R_S$. The server capacity is now $$C = \min\left\{\frac{R_D \cdot |B|}{|S|}, R_S\right\} \text{Mbps}, \qquad \text{(Equ. 9)}$$

which may be defined to be the server capacity equation.

Figure 20:
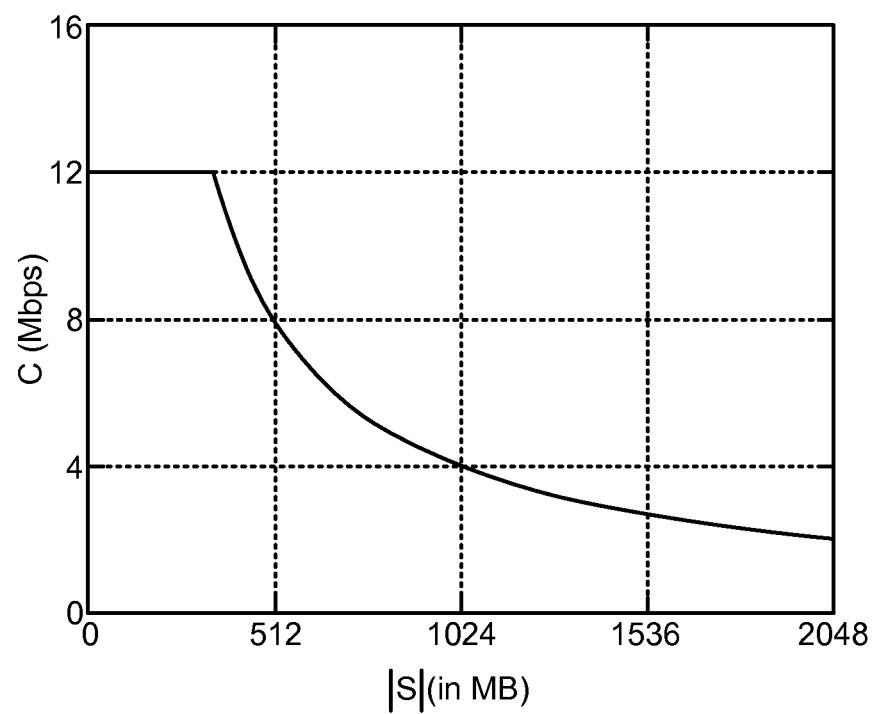
FIG. 20 is a plot of server capacity versus aggregate file length.

FIG. 20 shows a plot of the server capacity equation for a buffer length |B|=256 MB, a memory transfer speed $R_D$=16 Mbps and a maximum encoding rate of $R_S$=12 Mbps. If |S| is less than 341 MB, the server capacity C=12 Mbps is determined by the maximum encoding rate, and if |S| is greater than 341 MB, the server capacity C=4096/|S| Mbps is determined by the memory transfer speed. Any aggregate serving rate |R| that is above the curve is not achievable by the server. Note that a server with a large enough buffer |B| and a fast enough encoding speed $R_S$, can serve a file with a really slow memory transfer speed $R_D$ at the same rate as a server with a smaller buffer and a faster disk.

Allocating Time Slots to New Files and the Server Capacity

It may be desirable to dynamically add and delete files from a set of files currently being served. Another desirable property may be to be able to serve any combination of files, where the aggregate rates and lengths are at or below the server capacity.

In one embodiment, the number of time slots in the schedule c may stay the same when a file is added or deleted from a set of files being served. For instance, c may be chosen initially to be some fixed maximum number of time slots, where the buffer length assigned to a file is based on the value of c. Referring now to FIG. 3, the server 102 may stop serving a file j by freeing the c(j) time slots allocated to file j and reallocating the buffer length of B(j) MB to a pool of free buffer space. Similarly, a file j may be added if there are at least c(j) time slots available to allocate to file j, and there is at least B(j) MB of free buffer space available to assign file j. If the number of time slots c is greater than the number of slots currently allocated to the set of files being served, then the server 102 may insert an idle period for each slot not in use.

In this embodiment, the value of c may be determined by first choosing a maximum aggregate length and a maximum aggregate rate according to the server capacity equation. Any combination of files that have an aggregate rate and an aggregate length that is less than the maximum aggregate length and the maximum aggregate rate can then be scheduled to be served. For example, consider a maximum aggregate rate chosen to be |R|. If the buffer length |B| is fixed, then the server capacity equation implies a maximum aggregate file length that can be served of |S|=$R_D$·|B|/|R| MB. Consider an RD scheduling method where Gmin=Rmin, so the number of time slots c=|R|/Rmin. Alternatively, consider an LD scheduling method where Gmin=Smin, so the number of time slots c=|S|/Smin. In the above two examples, since the maximum aggregate rate, and maximum aggregate file length are fixed, the number of time slots c can be changed by varying Rmin or Smin. This may change the number of time slots allocated to a file, and/or the buffer length assigned to a file.

In another embodiment, the number of time slots in the schedule c may vary depending on the parameters of the set of files being served. For instance, c may be equal to the number of time slots assigned to the set of files currently being served, i.e., there are no empty time slots. The server 102 may stop serving a file j by removing the c(j) time slots allocated to file j from the schedule and reducing c by c(j). Also, the buffer length of B(j) MB may be reallocated to a pool of available buffer space, and the buffer lengths of the files still being served may be changed. Similarly, the server 102 may add a file j to be served by adding c(j) time slots allocated to file j to the schedule and increasing c by c(j). Also, a buffer length of B(j) MB may be allocated to file j from the pool of available buffer space, and the buffer lengths of the files still being served may be changed.

In one embodiment, the buffer length initially assigned to each file is larger than the actual buffer length required to serve the file at a corresponding rate, and only a fraction of the buffer length is used, where the fraction is based on the load on the server, i.e., the parameters of the set of files currently being served. For example, a large fixed buffer may be assigned to each file, or a fixed row length to each block in a file, and then the amount of the buffer actually used may vary as files are added or deleted from the server.

In one embodiment, the aggregate length of output symbols generated for a block, when the block is processed for the first time by the block encoder 215 varies according to a list of block indices which determines an ordering for processing the blocks in the file. For example, suppose the blocks are processed in ascending order of block index, and all the blocks in the file have the same row length. If the block encoder 215 fills the buffer for each block before starting to serve the file, then when the transmit module 230 starts transmitting packets for the file, the buffers for all the blocks will become empty at approximately the same time. Therefore, the block encoder 215 may increase or decrease the initial aggregate length of output symbols generated for each block in a file so that initial lengths are uniformly distributed between a minimum length and the row length, so that if all the blocks in the file are served at a same rate, then the row buffers will empty at roughly equally spaced time intervals. In another embodiment, the block encoder 215 may generate a fixed aggregate length of output symbols when a block is processed for the first time and the transmit module 230 may discard a portion of the output symbols when it first starts transmitting the file across the channels. For example, the transmit module may discard a portion of the buffer for a block according to a random or a pseudo-random function uniformly distributed between a minimum aggregate length and a maximum aggregate length of output symbols to discard.

The difference between a fixed value of c and a varying value of c according to the set of files being served may be illustrated by the following numerical example. Consider an RD scheduling method with Gmin=Rmin=0.5 Mbps. Let the maximum buffer length $|B|$=256 MB, the memory transfer speed $R_D$=16 Mbps and the maximum encoding rate be $R_S$=12 Mbps, so the server will have the same server capacity as shown in FIG. 20. Referring to FIG. 5, let the time slot duration be the time to load a block from the input symbol buffer 400 to fast buffer 405. If all files are broken into blocks of L=64 MB, then the time slot duration is 32 seconds.

In one embodiment, the maximum aggregate rate Rmax is chosen to be 4 Mbps. Therefore, the maximum aggregate length that can be served according to the plot in FIG. 20, is $|S|$=1 GB. The number of time slots is fixed, where c=Rmax/Rmin=4/0.5=8. Since all the blocks are of equal length, the row length for a block is $L \cdot Rmax/R_D$=64·4/16=16 MB, i.e., the buffer can allocate $|B|/16$=256/16=16 row lengths. Equivalently, the maximum aggregate length $|S|$=1 GB can be partitioned into 16 blocks of 64 MB. A file j will have a round time $t(j)=(Rmax/R_D) \cdot (S(j)/R(j))$ seconds and be assigned c(j)=R(j)/Rmin slots.

Figure 21A:
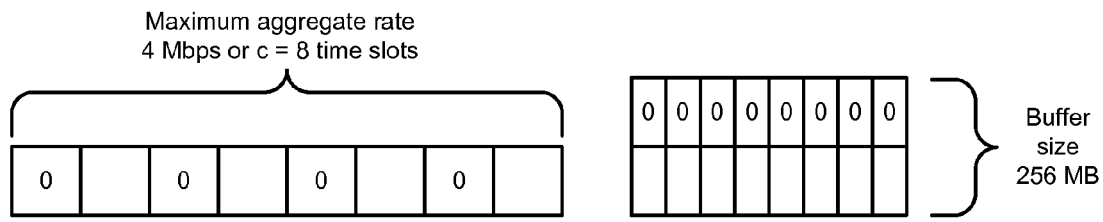
FIGS. 21a and 21b are illustrations of how a rate-dependent scheduler may schedule and allocate a buffer length to serve a first file and then a second file at their corresponding rates.
Figure 21B:
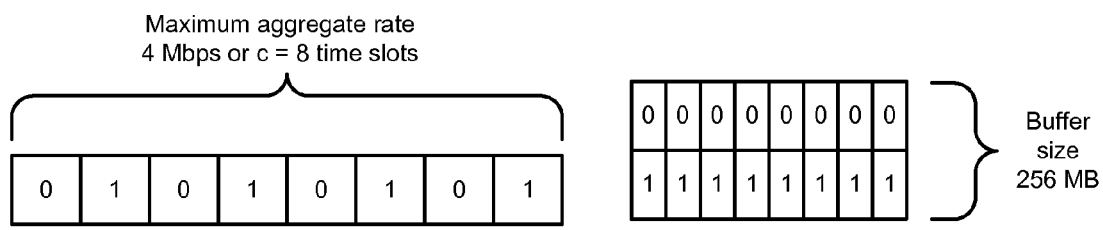

As an example, suppose initially the server is only serving a single file 0 of length S(0)=512 MB, i.e., 8 blocks, at a rate of R(0)=2 Mbps. The round time $t(0)=(Rmax/R_D) \cdot (S(0)/R(0))=(4/16) \cdot (512/(2/8))$=512 seconds and c(0)=4. The buffer length required for file 0 is $B(0)=R(0) \cdot t(0)$=128 MB or 8 row lengths. FIG. 21a shows an example of how an RD scheduling method may assign 4 of the 8 available time slots (left) and 8 of the 16 row lengths of the buffer (right) to file 0. Now consider a second file 1 of length S(1)=512 MB, i.e., 8 blocks to be served at a rate of R(1)=2 Mbps. The round time $t(1)=(Rmax/R_D) \cdot (S(1)/R(1))=(4/16) \cdot (512/(2/8))$=512 seconds and c(1)=4. The buffer length required for file 1 is $B(1)=R(1) \cdot t(1)$=128 MB or 8 row lengths. FIG. 21b shows an example of how an RD scheduling method may assign the 4 remaining time slots (left) and 8 free row lengths of the buffer (right) to file 1. In one embodiment, the buffer for file 0 remains the same length independent of how many files are added or deleted.

Figure 22:
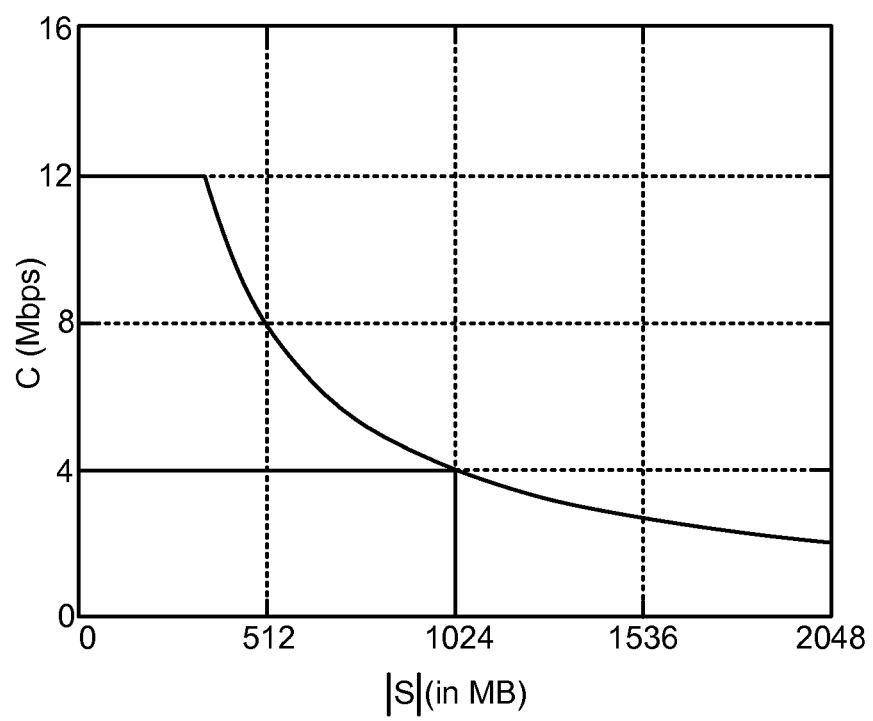
FIG. 22 is a plot of server capacity versus aggregate file length.

The server can add or delete files as long as the aggregate rate $|R| \leq 4$ Mbps and the aggregate length $|S| \leq 1$ GB. Therefore, the server is always operating in the region shown in FIG. 22 that is below and to the left of the horizontal and vertical lines respectively. In this embodiment, it may not be possible to serve a set of files that have an aggregate rate that is below server capacity for their aggregate length, but above the aggregate rate determined by the number of time slots and Rmin. Similarly, if file 1 is served at 1.5 MBps instead of 2 MBps, then an RD scheduling method has reached the limit allowed for the aggregate file length $|S|$ but still has an unused time slot.

In another embodiment, an RD scheduling is used and a the number of time slots c is chosen to be the number of time slots assigned to the set of files currently being served, i.e., c=$|R|$/Rmin. In this embodiment, there is no need to pick a maximum number of time slots initially. Since, all the blocks are of equal length, the row length for a block is $L \cdot |R|/R_D$=64·$|R|$/16=4$|R|$ MB, i.e., the row length now varies depending on the aggregate rate of the files being served and may have to be adjusted for each file, as files are added or deleted. In this way, an RD scheduling method should be able to achieve any point on or below the curve in FIG. 20. A file j will have a round time $t(j)=(|R|/RD) \cdot (S(j)/R(j))$ seconds and be assigned c(j)=R(j)/Rmin slots. Since the round time is based only on the aggregate rate of the set of files being served (as opposed to Rmax above), this embodiment minimizes the amount of buffer length allocated at all times.

Figure 23A:
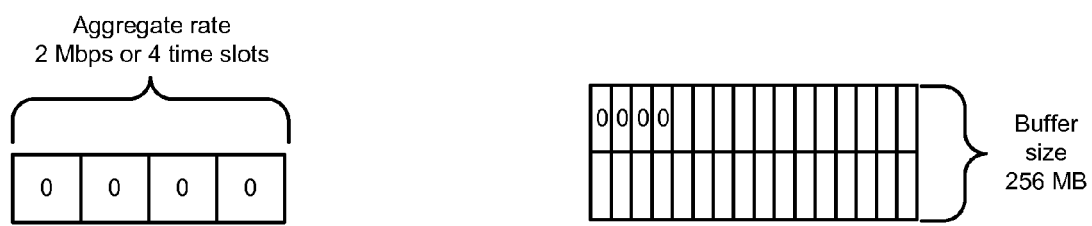
FIGS. 23a and 23b are illustrations of how a rate-dependent scheduler may schedule and allocate a buffer length to serve a first file and then a second file at their corresponding rates.
Figure 23B:
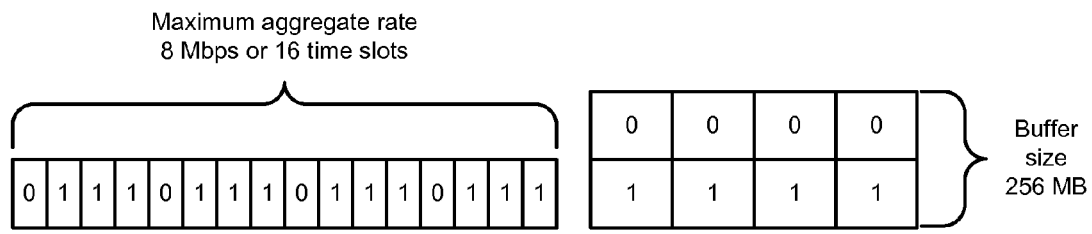

As an example, suppose initially the server is only serving a single file 0 of length S(0)=256 MB, i.e., 4 blocks, at a rate of R(0)=2 Mbps. The round time $t(0)=(|R|/R_D) \cdot (S(0)/R(0))=(2/16) \cdot (256/(2/8))$=128 seconds and c(0)=2/0.5=4. The buffer length required for file 0 is $B(0)=R(0) \cdot t(0)$=32 MB and the row length is 4 $|R|$ MB=8 MB. FIG. 23a shows an example of how an RD scheduling method may assign all 4 time slots (left) and 4 of 32 row lengths of the buffer (right) to file 0. Now consider a second file 1 of length S(1)=256 MB, i.e., 4 blocks to be served at a rate of R(1)=6 Mbps. The new aggregate rate is $|R|$=R(0)+R(1)=2+6=8 Mbps. The new round times are $t(0)=(|R|/R_D) \cdot (S(0)/R(0))=(8/16) \cdot (256/(2/8))$=512 seconds and $t(1)=(|R|/R_D) \cdot (S(1)/R(1))=(8/16) \cdot (256/(6/8))$=512/3 seconds. The file 1 is assigned c(1)=6/0.5=12 time slots and c=4+12=16 time slots. The new buffer lengths are $B(0)=R(0) \cdot t(0)$=128 MB and $B(1)=R(1) \cdot t(1)$=128 MB, and the row length is 4 $|R|$ MB=4·8=32 MB. FIG. 23b shows an example of how an RD scheduling method may assign the 16 time slots (left) and 8 row lengths of the buffer (right) to file 0 and file 1. An arbitrary number of files may be added as long as there is buffer length available and the aggregate rate $|R| \leq R_S$=12 Mbps.

Encoding and Decoding over Compound Blocks

In some implementations of chain reaction coding, the length of each block determines the efficiency of the chain reaction encoder and decoder. For example, referring to FIG.

3, the block encoder 215 and block decoder 270 may perform more efficiently if the entire block is in a fast access memory for encoding and decoding respectively. The choice of a block length is a trade-off between memory and the use of processing resources. Smaller blocks lead to lower memory requirements, while the encoding and decoding speeds (in Mbps) generally increase as the block length increases (for a fixed block size), as long as the entire block is in fast access memory. In one embodiment, different servers 102 are used to serve different ranges of block lengths, where different servers 102 may be optimized to generate output symbols for particular ranges of block lengths most efficiently.

In some implementations of chain reaction coding, there is also a trade-off between the overhead and the encoding/decoding speed. The amount of overhead is proportionately smaller for larger block sizes. To minimize the required overhead, the blocks should be as large as possible in size. Hence, for a fixed block length, increasing the symbol length improves encoding/decoding speed at the cost of overhead performance.

Another trade-off associated with the block length is the robustness of chain reaction codes, or FEC codes to packet loss. If each output symbol is lost at random, then the larger the number of blocks in a file, the higher the overhead associated with collecting enough output symbols to decode every block. For example, the client may receive many unnecessary output symbols associated with blocks that have already been decoded, while waiting for output symbols from a few remaining undecoded blocks. To minimize the overhead associated with waiting for enough output symbols to be received from each block, the file should be broken into as few blocks as possible, i.e., the block length should be as large as possible.

In one embodiment, the advantage of large blocks with respect to robustness to packet loss can be combined with the low memory usage of small blocks, by processing blocks in groups referred to as compound blocks. A compound block comprises a grouping of a plurality of blocks, which will be referred to as basic blocks. In this embodiment, all the basic blocks in a compound block are the same size. In the above description, the term "block" was used in the description of various apparatus, methods, etc. Unless otherwise indicated below, it should be assumed herein that what is described above with reference to basic blocks can also be used with reference to compound blocks.

The number of basic blocks in a compound block may be defined with respect to the block encoder 215 and/or the block decoder 270. For example, a compound block may comprise all the basic blocks that can be decoded by the block decoder 270 using a same set of operations. For instance, in some implementations of chain reaction codes, the block decoder 270 may first determine an order for recovering the input symbols in a basic block, and then recover the input symbols according to the order. Therefore, in one embodiment, a compound block may comprise a plurality of basic blocks all having a same order for recovering their respective input symbols. Thus, for the compound block, the block decoder 270 may determine an order for recovering the input symbols for one basic block and then decode all the basic blocks in that compound block using the same ordering It should be understood that compound blocks can be used with encoding schemes other than chain reaction codes. For example, with a FEC code, such as a Reed-Solomon code, a Tornado code, or the like, a compound block may comprise a plurality of basic blocks each requiring the same set of operation to be performed in order to decode the respective basic blocks.

In one embodiment, the block decoder 270 may recover the basic blocks comprising a compound block in series. In another embodiment, the block decoder 270 may recover two or more basic blocks in parallel. In yet another embodiment, each block decoder 270 may independently determine whether one or more blocks are decoded at once. For example, the number of basic blocks decoded in parallel may be chosen according to the memory available to each block decoder 270. As another example, the number of basic blocks decoded in parallel may be chosen according to the processor resources at the decoder, such as the word length of an operation in the processor or the number of processors available. The output symbols for a basic block may be stored in an interleaved manner in the decoder temporary storage buffer 255, or each basic block may be stored as a contiguous unit. Where two or more basic blocks are processed by the block decoder 270 in parallel, the blocks may be stored as a contiguous unit, where the output symbols may or may not be stored in an interleaved manner.

Figure 24:
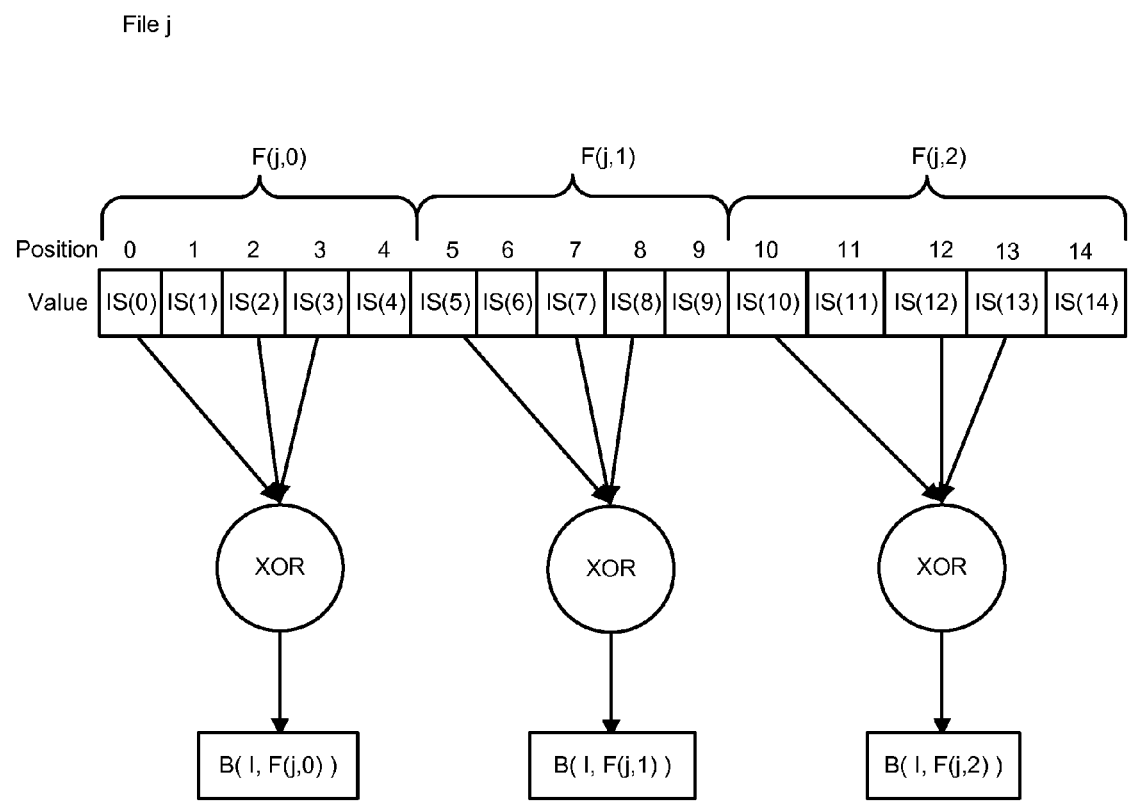
FIG. 24 is an illustration of how output symbols in a compound block may be generated as the same value function of selected input symbols in the same positions for all the basic blocks in the compound block.

In one embodiment, all the basic blocks in a compound block are encoded using a same set of operations. Encoding blocks using a same set of operations may include generating output symbols from each of the blocks in a same manner, which may include using a same key, a same value function, a same set of associated input symbols relative to the location of the block within the file, and the like. In a specific embodiment, output symbols generated from each of the blocks in a same manner are included in a packet for transmission. FIG. 24 is an example of how a block encoder 215 may generate the output symbols in a compound block as the same value function of selected input symbols in the same positions for all the basic blocks in the compound block. In the example shown, the value function is XOR, the weight W(I,F) of the output symbol is 3, the compound block comprises three basic blocks in the file j, namely F(j,0), F(j,1), and F(j,2), the associated input symbols (the associates) are at the first, third and fourth positions of each basic block. Thus, the three output symbols are calculated as B(I,F(j,0))=IS(0) XOR IS(2) XOR IS(3), B(I,F(j,1))=IS(5) XOR IS(7) XOR IS(8), and B(I,F(j,2))=IS(10) XOR IS(12) XOR IS(13) for that value of I.

Figure 25A:
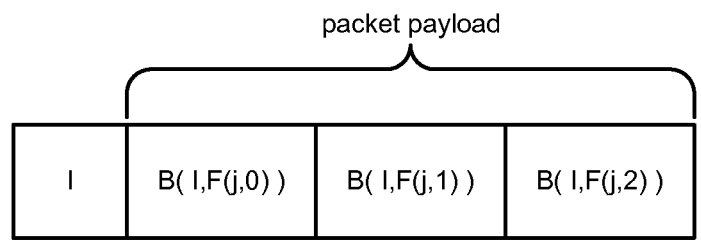
FIGS. 25*a* and 25*b* are illustrations of how output symbols from a compound block may form a packet payload of a packet transmitted across the channel along with a key I.
Figure 25B:
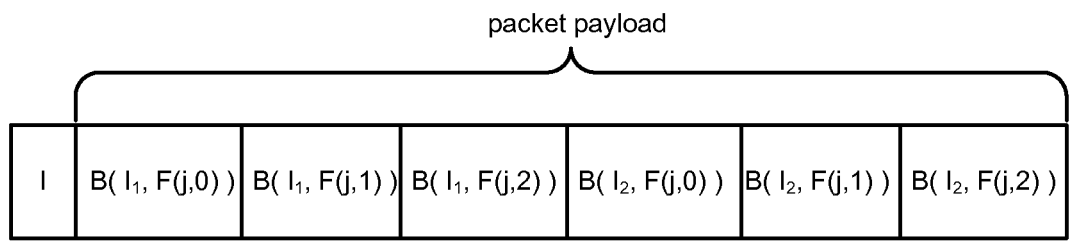
Figure 26:
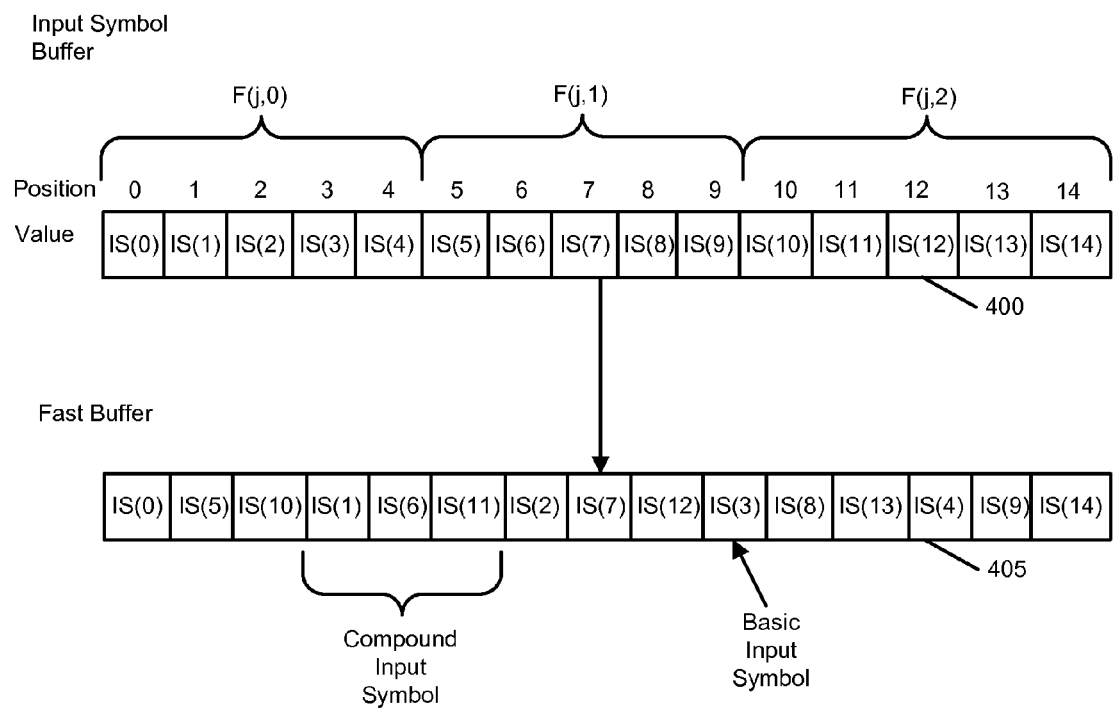
FIG. 26 is an illustration of how input symbols in a compound block may be interleaved when loaded into a fast access memory.

FIG. 25$a$ is an example of how three output symbols, computed for the compound block in FIG. 24, may form a packet payload of a packet transmitted across the channel along with the key I. FIG. 25$b$ is an example of how two sets of three output symbols from the same compound block may form the packet payload of a packet transmitted across the channel along with a key I. In the example shown, the keys $I_1$ and $I_2$ are calculated as a function of the key I sent in the packet. In another embodiment, the output symbols associated with the same basic block are stored contiguously in the packet payload.

In one embodiment, the ratio of the packet payload length (PPL) to the output symbol length may determine the number of basic blocks in a compound block. For example, if the packet payload length PPL=1 KB, and the symbol length is 64 bytes, then a compound block comprises 1, 2, 4, 8 or 16 basic blocks, based on how many output symbols for a compound block are sent in a packet payload. Since a packet payload should include an integer number of output symbols, if all the blocks in a file are the same size, then the maximum compound block length for a file is K·PPL, i.e., the number of input symbols in a block multiplied by the maximum output symbol length for a compound block. For example, in one embodiment, the number of input symbols is chosen in the range $65{,}537 \leq K \leq 131{,}071$, i.e., between $2^{16}$ and $2^{17}$, based on the length of the file. If the maximum packet payload length is PPL=1 KB, then the maximum compound block length is approximately 128 MB. If the input symbol length is 32 bytes, then the maximum basic block length is approximately 4 MB. The packet payload length PPL, may be based on a packet payload length defined by the channel, and/or the file transmission system, or it may be based on the expected loss characteristics for the channel. In other variations, the packet payload length may be based on other factors as well. For example, the packet payload length may be restricted to be a power of 2.

The use of compound blocks may improve the encoding efficiency at the server and allow servers with heterogeneous resources to encode basic blocks according to the fast access memory available to the block encoder 215. For example, in some implementations of chain reaction codes, the block encoder 215 may spend a significant amount of time generating a key I, determining the weight W(I) and a list AL(I) of W(I) input symbol positions. For compound blocks, the block encoder 215 may determine a key I, W(I) and AL(I) only once and encode all the basic blocks in a compound block using these values. Here AL(I) is understood to be a set of neighbor's positions indexed relative to the start of a basic block. In fact, the block encoder 215 may encode all blocks being served that are the same size using the same key I, W(I) and AL(I). In one embodiment, the block encoder 215 encodes the basic blocks in a compound in series block using the same key. In another embodiment, the block encoder 215 may encode two or more basic blocks in parallel. For example, the number of basic blocks encoded in parallel may be chosen according to memory available to the block encoder 215. As another example, the number of basic blocks encoded in parallel may be chosen according to the processor resources at the encoder, such as the word length of an operation in the processor or the number of processors available.

Figure 27:
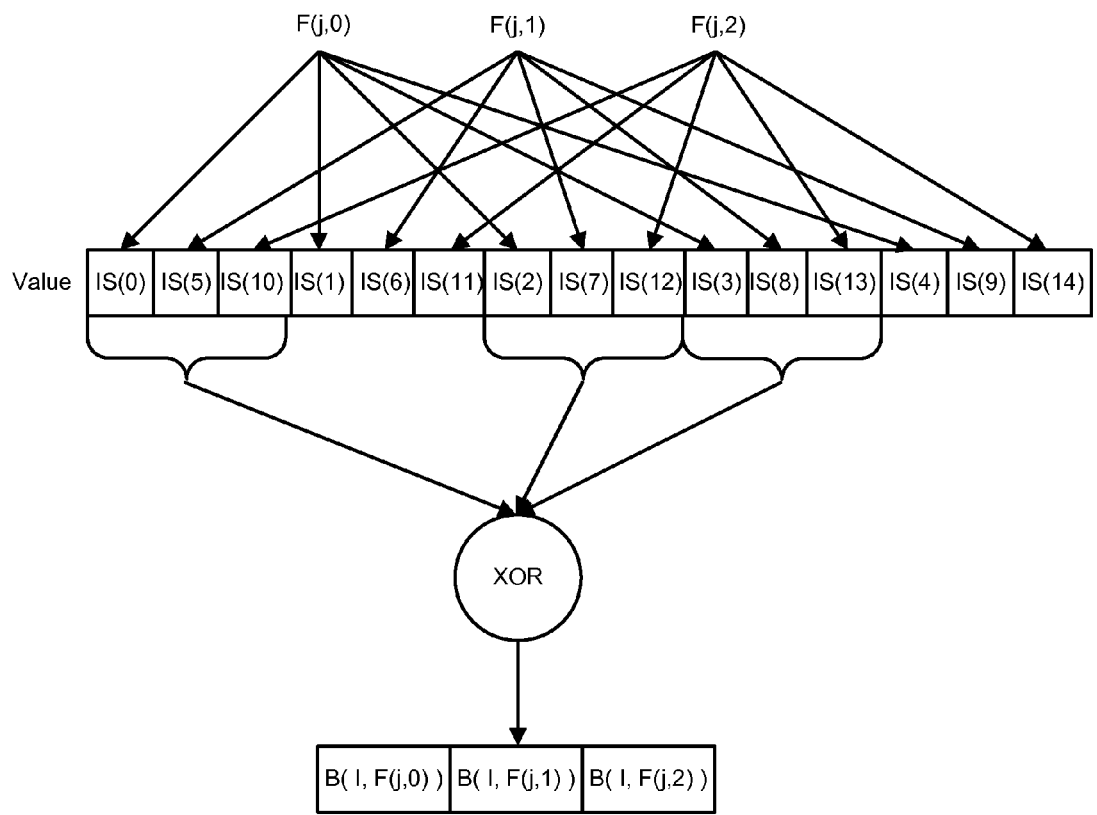
FIG. 27 is the logical equivalent of FIG. 24, wherein basic blocks are stored in an interleaved manner in a fast access memory.

Referring to FIG. 5, in one embodiment, the input symbols in a compound block are interleaved in the input symbol buffer 400, and/or in the fast buffer 405. With reference to FIGS. 3-5, FIG. 26 shows an example of how an encoder 315 may interleave the input symbols in a compound block when loading a compound block from the input symbol buffer 400 to the fast buffer 405. In the example shown, the compound block comprises three basic blocks in the file j, namely F(j,0), F(j,1), and F(j,2). Each basic block is stored contiguously in the input symbol buffer 400, whereas the input symbols in the same relative positions in each basic block are stored contiguously in fast buffer 400. For example, the second input symbol in each of the three basic blocks, namely IS(1), IS(6) and IS(11), are interleaved and stored contiguously to form a compound input symbol, where a compound input symbol refers to the set of input symbols in the same relative position in all the basic blocks of a compound block. FIG. 27 is the logical equivalent of FIG. 24, wherein the three basic blocks are now stored in an interleaved manner in a fast access memory.

The use of compound blocks may improve the decoding efficiency at a client 104 and allow clients with heterogeneous resources to decode basic blocks according to the fast access memory available to the block decoder 270. For example, in some implementations of chain reaction codes, the block decoder 270 may spend a significant amount of time generating a decoding schedule from received keys. The decoding schedule can be used to determine how and in which order to recover the input symbols of a basic block from the received output symbols for that basic block. For compound blocks, the block decoder 270 may store the received keys in a temporary file and the output symbols for different basic blocks in different temporary files. For example, suppose the transmit module 230 sends packets in the form shown in FIG. 25a computed by the block encoder 215 for the compound block shown in FIG. 24. FIG. 28a shows four packets received by receive module 250 with keys I1, I2, I3 and I4. If the client 104 only has enough available fast access memory to decode one basic block at a time, the client 104 may keep the keys in a temporary file either in fast access memory or in slower storage. For example, slower storage could be disk and faster access memory could be RAM. Then for each basic block, the received output symbols for that basic block can be saved in a separate temporary file, which can be either fast access memory or in slower storage as shown in FIG. 28b, according to how much fast access memory is available. In this example, the received output symbols for basic block F(j,0), F(j,1), and F(j,2) are stored in Temp0, Temp1 and Temp2, respectively. The client scheduler 260 can then use the received keys to generate a decoder schedule and this same schedule can be used to decode basic blocks F(j,0), F(j,1), and F(j,2) by applying the decode schedule to Temp0, Temp1, and Temp2, respectively. Thus, in this embodiment decoder temporary storage buffer 255 includes the slower storage, and the block decoder 270 includes a fast access memory. The block decoder 270 may bring the temporary files into a fast access memory from a slower storage to decode the basic blocks as for example described previously and as illustrated in FIG. 11a or FIG. 11b.

The basic blocks within a file may be scheduled to be recovered starting with the first basic block of the file and ending with the last basic block of the file. One way of forming compound blocks is from consecutive basic blocks within the file. In this case, the moving the temporary files for basic blocks into and out of fast access memory from slower storage crosses compound block boundaries. For example, when the temporary file for the last basic block of one compound block is moved into fast access memory, the next temporary file to be moved into fast access memory may be the temporary file for the first basic block in the next compound block. Another way that basic blocks may be scheduled to be moved into fast access memory is according to the order in which the recovered basic blocks are used by an application. If this order of access is known either before or while the recovery process is occurring, then the temporary files for the blocks can be scheduled for recover according to the order of access.

For compound blocks, the block decoder 270 of another client 104 with more fast access memory resources may store the received keys and the output symbols for different basic blocks in the same temporary file. For example, suppose the FIG. 28a shows four packets received by receive module 250 with keys I1, I2, I3 and I4. If the client 104 has enough available fast access memory to store all received keys and output symbols from all three basic blocks F(j,0), F(j,1) and F(j,2) of the compound block, then it may store the keys in one temporary file in fast access memory as shown in FIG. 28c. The client scheduler 260 can then use the received keys to generate a decoder schedule and this same schedule can be used to decode basic blocks F(j,0), F(j,1), and F(j,2) by applying the decode schedule to the received compound output symbols. Thus, a client 104 with more fast access memory resources may utilize them to decode together multiple basic blocks that are part or all of a compound block, and this may provide overall faster decoding than the decoding speed for a client 104 with less fast access memory resources. Then, different clients 104 can make individual tradeoffs on how best to utilize their available fast access memory and slower storage in order to decode as quickly as possible compound blocks that comprise one or more basic blocks.

It is to be understood that the various functional blocks in FIGS. 2-5, 7, and 9 may be implemented by a combination of hardware and/or software, and that in specific implementations some or all of the functionality of some of the blocks may be combined. Similarly, it is also to be understood that the various methods discussed herein may be implemented by a combination of hardware and/or software.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for serving a file using a server coupled to a data network, the method comprising:
    determining a file, wherein the file includes an integer number of compound blocks, wherein each compound block includes at least one basic block, wherein at least one of the compound blocks includes at least two basic blocks, wherein each basic block includes at least one input symbol;
    determining an indication of multiple channels on which to serve the file;
    determining a rate at which to serve the file;
    determining a schedule for processing the basic blocks;
    generating output symbols for the basic blocks according to the schedule, wherein the output symbols for the basic blocks comprising each compound block are generated using a same set of operations;
    assembling the output symbols for the basic blocks into compound output symbols; and
    transmitting the compound output symbols on the corresponding multiple channels, such that the file is served at the corresponding rate.

2. The method of claim 1, wherein generating the output symbols for the basic blocks comprising each compound block using the same set of operations includes one or more of using a same key, using a same value function, and using a same set of associated input symbols in same positions for all the basic blocks comprising the compound block.

3. The method of claim 1, wherein generating output symbols includes generating output symbols for a plurality of basic blocks comprising a same compound block concurrently.

4. The method of claim 3, wherein the plurality of basic blocks is determined according to at least one of memory and processor resources available at an encoder at the server.

5. A system comprising processor and memory for serving a file using a server coupled to a data network, and the server having an input to receive the file in electronic form, the system comprising:
    a file block scheduler configured to determine an identity of the file, wherein the file includes an integer number of compound blocks, each compound block includes at least one basic block, at least one of the compound blocks includes at least two basic blocks, and each basic block includes at least one input symbol, the file block scheduler further configured to determine an indication of multiple channels on which to serve the file, to determine a rate at which to serve the file, and to determine a schedule for processing the basic blocks;
    a block encoder communicatively coupled with the file block scheduler and configured to generate output symbols for the basic blocks according to the schedule, wherein the output symbols for the basic blocks comprising each compound block are generated using a same set of operations, the block encoder further configured to assemble the output symbols for the basic blocks into compound output symbols; and
    a transmit module communicatively coupled with the block encoder and configured to transmit the compound output symbols on the corresponding multiple channels, such that the file is served at the corresponding rate.

6. The system of claim 5, wherein the block encoder is configured to generate the output symbols for the basic blocks comprising each compound block using one or more of a same key, a same value function, and a same set of associated input symbols in same positions for all the basic blocks comprising the compound block.

7. The system of claim 5, wherein the block encoder is configured to generate output symbols for a plurality of basic blocks comprising a same compound block concurrently.

8. The system of claim 7, wherein the plurality of basic blocks is determined according to at least one of memory and processor resources available at the block encoder.

9. A system for serving a file using a server coupled to a data network, the system comprising:
    means for determining a file, wherein the file includes an integer number of compound blocks, each compound block includes at least one basic block, at least one of the compound blocks includes at least two basic blocks, and each basic block includes at least one input symbol;
    means for determining an indication of multiple channels on which to serve the file;
    determining a rate at which to serve the file;
    means for determining a schedule for processing the basic blocks;
    means for generating output symbols for the basic blocks according to the schedule, wherein the output symbols for the basic blocks comprising each compound block are generated using a same set of operations;
    means for assembling the output symbols for the basic blocks into compound output symbols; and
    means for transmitting the compound output symbols on the corresponding multiple channels, such that the file is served at the corresponding rate.

10. The system of claim 9, wherein the means for generating are for generating the output symbols for the basic blocks comprising each compound block using one or more of a same key, a same value function, and a same set of associated input symbols in same positions for all the basic blocks comprising the compound block.

11. The system of claim 9, wherein the means for generating are for generating output symbols for a plurality of basic blocks comprising a same compound block concurrently.

12. The system of claim 11, wherein the plurality of basic blocks is determined according to at least one of memory means and processing means available at the server.

13. A non-transitory computer program product for serving a file using a server coupled to a data network, the product comprising:
    a processor-readable medium storing processor-readable instructions configured to cause a processor to:
        determine a file, wherein the file includes an integer number of compound blocks, wherein each compound block includes at least one basic block, wherein at least one of the compound blocks includes at least two basic blocks, wherein each basic block includes at least one input symbol;
        determine an indication of multiple channels on which to serve the file;
        determine a rate at which to serve the file;

determine a schedule for processing the basic blocks;

generate output symbols for the basic blocks according to the schedule, wherein the output symbols for the basic blocks comprising each compound block are generated using a same set of operations; and assemble the output symbols for the basic blocks into compound output symbols, such that the file is served at the corresponding rate by transmitting the compound output symbols on the corresponding multiple channels.

14. The product of claim 13, wherein the processor-readable medium is configured to cause the processor to generate the output symbols for the basic blocks comprising each compound block using one or more of a same key, a same value function, and a same set of associated input symbols in same positions for all the basic blocks comprising the compound block.

15. The product of claim 13, wherein the processor-readable medium is configured to cause the processor to generate output symbols for a plurality of basic blocks comprising a same compound block concurrently.

16. The product of claim 15, wherein the plurality of basic blocks is determined according to at least one of memory and processor resources available at an encoder at the server.

* * * * *